US012595643B2

(12) United States Patent
Kim et al.

(10) Patent No.: US 12,595,643 B2
(45) Date of Patent: Apr. 7, 2026

(54) LIQUID FLOW PROCESSING FOR PLUMBING SYSTEMS

(71) Applicant: Phyn LLC, El Segundo, CA (US)

(72) Inventors: Ryan Yong Kim, Rolling Hills Estates, CA (US); Salil P. Banerjee, Lynchburg, VA (US)

(73) Assignee: Phyn LLC, El Segundo, CA (US)

( * ) Notice: Subject to any disclaimer, the term of this patent is extended or adjusted under 35 U.S.C. 154(b) by 45 days.

(21) Appl. No.: 18/582,514

(22) Filed: Feb. 20, 2024

(65) Prior Publication Data

US 2024/0254736 A1     Aug. 1, 2024

Related U.S. Application Data

(63) Continuation of application No. 17/322,627, filed on May 17, 2021, now Pat. No. 11,905,688.

(60) Provisional application No. 63/025,829, filed on May 15, 2020.

(51) Int. Cl.
*E03B 7/00* (2006.01)
*G01M 3/28* (2006.01)

(52) U.S. Cl.
CPC ........... *E03B 7/003* (2013.01); *G01M 3/2815* (2013.01)

(58) Field of Classification Search
CPC ..... E03B 7/003; G01M 3/2815; G01M 3/243; G01M 3/28; Y02A 20/15
See application file for complete search history.

(56) References Cited

U.S. PATENT DOCUMENTS

| | | | | |
|---|---|---|---|---|
| 5,412,616 A | * | 5/1995 | Gonzalez ........... | G05B 23/0291 |
| | | | | 367/13 |
| 5,708,195 A | * | 1/1998 | Kurisu ................ | G01M 3/2815 |
| | | | | 73/40 |
| 2013/0307350 A1 | * | 11/2013 | Ogden .................... | F16K 17/36 |
| | | | | 307/119 |
| 2019/0138995 A1 | * | 5/2019 | Currin .................... | G06F 16/904 |
| 2020/0054911 A1 | * | 2/2020 | Barkay .................. | A62C 35/20 |
| 2021/0181362 A1 | * | 6/2021 | Jiang ..................... | G01V 20/00 |

FOREIGN PATENT DOCUMENTS

| | | | | |
|---|---|---|---|---|
| JP | 2016030981 A | * | 3/2016 | |
| WO | 2015129031 A1 | | 9/2015 | |
| WO | 2018125740 A1 | | 7/2018 | |
| WO | 2019133594 A2 | | 7/2019 | |

* cited by examiner

*Primary Examiner* — Catherine T. Rastovski
*Assistant Examiner* — Lal Ce Mang
(74) *Attorney, Agent, or Firm* — MUGHAL GAUDRY & FRANKLIN PC

(57)     ABSTRACT

Systems and methods for determining leaks in a water distribution system using water devices within buildings. Pressure readings over time from two or more water devices. Egress readings and possibly other noise are removed from the pressure readings to isolate signals for leaks from outside of the buildings. Using the isolated signals, the location of the leak in the water distribution system can be approximated.

20 Claims, 17 Drawing Sheets

440

612

544

512

524

608

Electronics

LIQUID FLOW PROCESSING FOR PLUMBING SYSTEMS

PRIORITY

This application is a continuation of U.S. patent application Ser. No. 17/322,627, filed May 17, 2021, and entitled "LIQUID FLOW PROCESSING FOR PLUMBING SYS-TEMS", which claims priority to U.S. Provisional Patent Application No. 63/025,829, filed on May 15, 2020, entitled "LIQUID FLOW PROCESSING FOR PLUMBING SYS-TEMS," the disclosures of which are hereby incorporated by reference in their entirety for any purpose.

BACKGROUND

This disclosure relates in general to systems and methods for determining processing liquid flow and/or structure movement using plumbing sensors.

Water resources are subject to drought and other changes in climate that make optimizing distribution important. Municipal water systems may lose 40% or more of the water before it reaches consumers. Leaks, evaporation and other water waste are problems with significant repercussions as population and other growth increase demand.

Municipal water systems have many pipes with branches and valves that all deteriorate over time. Leakage wastes water and cause erosion, sink holes and landslides. Finding those leaks is difficult as pipes are poorly mapped and buried underground. Streets are torn up and trenches dug in an attempt to find leaks. As cities age, the distribution systems leak as does the cost and complexity of repairing pipes. Many municipal water systems have brittle clay pipes or lead pipes that leach impacting water quality.

SUMMARY

In one embodiment, systems and methods for determining leaks in a water distribution system using water devices within buildings is disclosed. Pressure readings over time from two or more water devices. Egress readings and possibly other noise are removed from the pressure readings to isolate signals for leaks from outside of the buildings. Using the isolated signals, the location of the leak in the water distribution system can be approximated.

In another embodiment, a leak detection system for determining upstream leaks in a water distribution system is disclosed. The leak detection system comprising: a first water device, a second water device and a processor. The first water device includes a first pressure sensor. The first water device is configured to: measure using the first pressure sensor, a first pressure signal within a first plumbing system in a first building at a first location; and, report the first pressure over time away from the first location. The second water device includes a second pressure sensor. The second water device is configured to: measure using the second pressure sensor, a second pressure signal within a second plumbing system in a second building at a second location; and, report the second pressure over time away from the second location. The first plumbing system taps off the water distribution system away from where the second plumbing system taps off the water distribution system. The processor is remote to one of the first or second water devices. The processor is configured to: receive the first and second pressure over time, and analyze the first pressure and the second pressure over time to algorithmically identify a leak in the water distribution system outside of the first and second buildings.

In one embodiment, a method for upstream leak detection for a water distribution system is disclosed. Using the first pressure sensor, a first pressure signal is measured within a first plumbing system in a first building at a first location. The first pressure sensor is within a first water device. The first pressure over time is reported away from the first location. Using the second pressure sensor, a second pressure signal is measured within a second plumbing system in a second building at a second location. The second pressure sensor is within a second water device. The second pressure over time is reported away from the second location. The first plumbing system taps off the water distribution system away from where the second plumbing system taps off the water distribution system. The first and second pressure over time are received using a processor remote to one of the first or second water devices. The first pressure and the second pressure over time are analyzed to algorithmically identifying a leak in the water distribution system outside of the first and second buildings.

In still another embodiment, A leak detection system for determining upstream leaks in a water distribution system, comprising one or more processors and one or more memories with code for:

measuring, using the first pressure sensor, a first pressure signal within a first plumbing system in a first building at a first location, wherein the first pressure sensor is within a first water device;

reporting the first pressure over time away from the first location;

measuring, using the second pressure sensor, a second pressure signal within a second plumbing system in a second building at a second location, wherein the second pressure sensor is within a second water device;

reporting the second pressure over time away from the second location, wherein the first plumbing system taps off the water distribution system away from where the second plumbing system taps off the water distribution system;

receiving the first and second pressure over time remote to one of the first or second water devices; and analyzing the first pressure and the second pressure over time, comprising algorithmically identifying a leak in the water distribution system outside of the first and second buildings.

An embodiment of a universal kit that adapts a water device to any diameter source pipe. A bypass pipe diverts some of the flow around the water device. Measurements of flow in the water device through a parasite path is used to determine the flow through the source pipe. Machine learning and fluid dynamics over time with deep learning is used to refine source pipe flow measured by the water device measuring the parasite path. Some embodiments put a shutoff valve on the bypass pipe to improve measurements when shut. Other embodiments add a flow meter to the bypass pipe. There can be one, two or three bypass pipes around the water device in various embodiments.

Exemplary embodiments of the disclosure provide systems and methods for determining a location of noise in sensor readings from a plumbing system that includes signal from outside a building coupled from a municipal water system. According to an aspect of the disclosure, a water analysis system includes a first sensor that is configured to measure a first pressure or flow signal as a function of time at a first location within the plumbing system, and a second sensor that is configured to measure a second pressure signal or flow as a function of time at a second location within the plumbing system. The plumbing system includes multiple branch points between the first location and the second location. The system also includes a processor that is configured to determine a temporal difference between a first pressure drop in the first pressure signal and a second pressure drop in the second pressure signal, and use the temporal difference to determine an estimated location of the water movement causing the sensor readings. Where it is determined that the water movement being sensed is outside the plumbing system being monitored, that signal is noise that is filtered out.

Exemplary embodiments of the disclosure provide for systems and methods for detecting movement of fluid in plumbing systems. Pressure, flow and/or temperature measurements in a plumbing system for a building react to movement of the building or other structure. A water device with a pressure, temperature and/or flow sensor coupled to the fluid in a pipe or the plumbing system is affected by egress, flow, leaks, and use in the municipal water system. The sensor signal from normal operation and use can be filtered away to find the fraction of signal associated with movement of the plumbing system. Neighboring water devices not in the same building or structure can be used to further filter out the undesired signals. Accumulating pressure data from a multitude of water devices in known locations allows determining of seismic activity over a geography. Remedial action is taken in some embodiments to increase sensitivity to movement and/or leaks, for example increasing sampling rates of the sensor(s) or reporting rates, closing valves, notifying persons that might fix problems.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTIONS OF THE DRAWINGS

The present disclosure is described in conjunction with the appended figures.

Figure 1A:
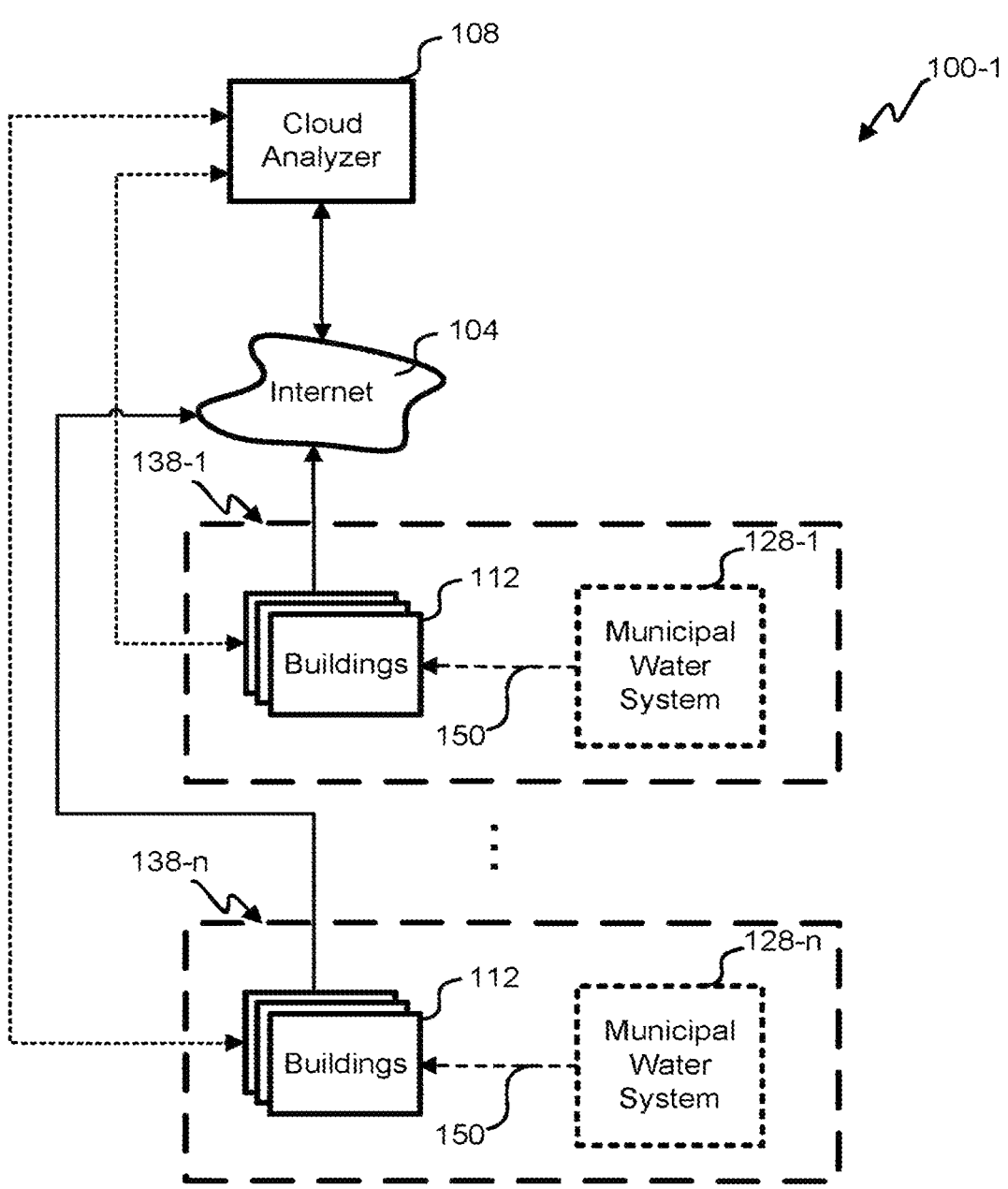
FIGS. 1A-1C illustrate block diagrams of embodiments of a water analysis system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

For water supplier utilities that are trying to track down potential leaks in main water distribution networks and other utility uses (e.g. demand planning, optimal distribution pipe network planning, etc.), we can aggregate pressure readings from multiple devices coupled to a particular distribution branch that are "grouped" as needed and monitor them in such a way that if they all experience the same or very similar pressure reduction in a narrow window of time, we could raise a flag of some sort to the utility that supplies water to that neighborhood. Such an indication signal that a leak has occurred on a common distribution conduit that is shared and upstream from those particular set of buildings as an example. One of the biggest challenges that water utilities face is "unbillable water." Basically, they measure how much water they are distributing, and calculate how much of that water is metered and "billable". And, somewhere between 10 to 20% of the water is "lost". Much of it lost through leaks in the main distribution networks. And many leaks are difficult to find.

Demand monitoring can also be projected and reported based on historical usage trends and patterns. Changes in pressure patterns can provide utilities with information regarding potential installations of boosters/pump. Consistent low pressure patterns can provide insights into preexisting leaks within a region of the municipal water system. Changes in pressure might also be used to highlight failing pumps along the water distribution network.

With the increase in the number of water devices, we can build a network of sensors that measures pressures constantly and in near-real time. For each of these water devices we build statistical and machine learning based models that indicate what the typical pressure and range of variation is for a neighborhood. Any significant deviation/anomaly from the pressure can be detected in near real time and the municipality or utility can be alerted to take corrective action. In many situations these changes in pressure upstream of the devices while there being no flow detected by the flow sensors would be indicative of a leak upstream of the buildings. If this only impacts a single building, then it could possibly be an issue within or near the building, for example, a leak in a sprinkler system. However, if this anomalous pressure behavior is detected by many water devices in different buildings then it is indicative of a municipality plumbing issue.

Detection of upstream leaks will work for the set of buildings that do not have a pressure reducing valve (PRV) since they're directly exposed to the water system's pressure variations. In building that have PRV, sudden city leaks will not show an exact reduction in pressure since the PRV is acting as signal smoother. To detect the issue in these buildings, the PRV will stop behaving as expected since the water system pressure will be below the set-point of the PRV and the pressure signal detected in the water will start behaving increasingly as a mix of PRV and non-PRV situations. While this may not point to the exact location of the leak, this data combined with a geo-spatial map will allow cities to gather insight into a potential section/sub-section or branch of the city plumbing that could be leaking.

Upstream leak detection can be expanded in a multi-family dwelling or complex. The anomalous pressure change detected could indicate the leak is between two sub-sections/floors supplied within the same building or two buildings in the case of a multi-building complex. In some cases, the leak could be in a neighboring unit.

Referring initially to FIG. 1A, a block diagram of an embodiment of a water analysis system 100-1 is shown. A cloud analyzer 108 is located remotely to one or more municipalities 138 and accessible over the Internet 104 or a LAN or a WAN in other embodiments. Each municipality 138 includes a shared municipal or utility water system 128 that supplies water service to a number of buildings 112 (e.g., homes, apartments and commercial buildings). The location or address each building 112 is known with each building 112 including one or more water devices that measures water activity in a plumbing system for the respective building 112 or unit within the building 112. Although not shown, some buildings 112 can receive their water from a private source such as a well, cistern, tank, etc. In any event, location information for the building 112 having the water device is generally known along with the source of water service whether that be a private source or from a municipal water system 128.

The cloud analyzer 108 gathers water readings from across the world from various buildings 112 having different municipal water systems 128. The building location is generally known along with some information on the building 112 (age of building, size of unit(s) serviced by plumbing for water device, number of egress points, type of water source, address, floor, various fixtures, bathroom configuration, irrigation information, number of residents, plumber contact info, etc.). Each water device can report at various intervals, for example, a 5 second interval. When certain conditions are recognized by either the cloud analyzer 108 or water device, the reporting interval can be increased or decreased. Further, the water device can trigger a report outside of the reporting interval if an aberrant condition is detected (e.g., leak, building movement, high pressure, freeze, etc.). Some embodiments can have multiple cloud analyzers 108 to provide redundancy and/or divide the loading that coordinate to make unified decision making. Machine learning and artificial intelligence can be utilized by the cloud analyzer 108 to process the incoming information.

Figure 1B:
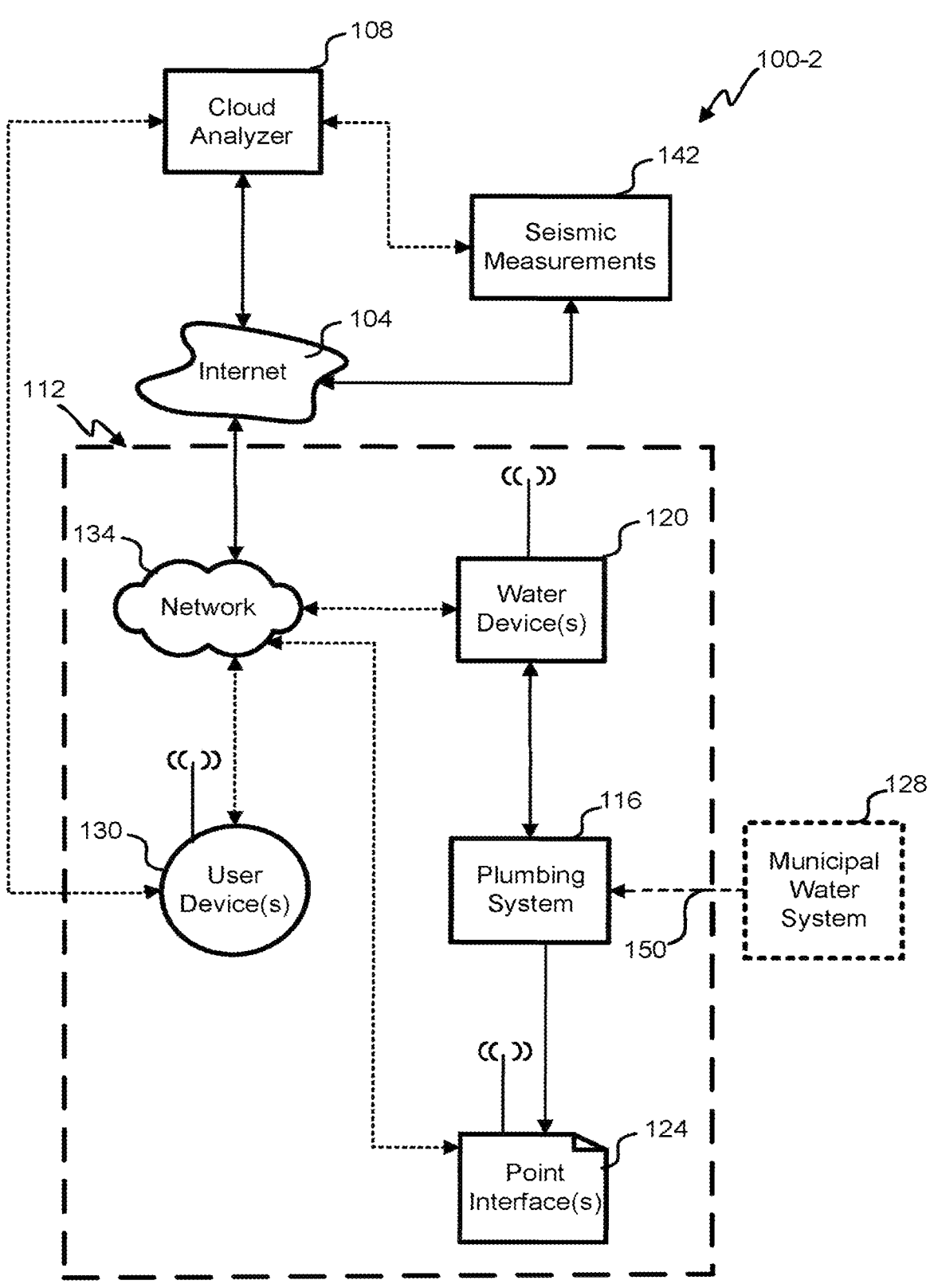

With reference to FIG. 1B, a block diagram of an embodiment of a water analysis system 100-2 is shown. This embodiment shows a single municipality 138 with a single building 112 although there can be many other buildings in other embodiments. The municipal water system 128 is connected to the building 112 with a water main 150, but other embodiments could source their water from a well, a cistern, a tank, and/or any other source. Different water sources may use different flow and leak detection algorithms. The water main 150 is often coupled to many other neighboring buildings and units with some at least partially isolated with a PRV on the same distribution branch of the municipal water system 128.

The water from the municipal water system 128 has a temperature that varies relatively slowly since they are typically delivered via pipes which are buried underground. With the ground acting as a heat sink, there is less variation in temperature as compared to the atmospheric temperature outside or inside the building 112. The temperatures of municipal water systems 128 vary between 40 to 55° F. (4 to 13° C.) on average. Such temperature changes are dependent upon distribution systems, well depth, aboveground storage facilities, etc. Surface water temperatures vary with seasonal change between 40 to 80° F. (4 to 27° C.) with even higher temperatures in the deep South and Southwest of the United States for example. It can be said that the municipal water system 128 temperature remains relatively stable during a given season for a given location (temperature varies from 38° F. in Anchorage, AK to 82° F. in Phoenix, AZ). Temperature changes seen in the plumbing system 116 are influenced by water flowing through the pipes at various flow rates and can be helpful in detecting small unintended water usages or leaks continuously without engaging the shut-off-valve or other techniques that actively engage the plumbing system as described in U.S. Pat. No. 10,094,095, entitled "SYSTEM AND METHOD FOR LEAK CHARACTERIZATION AFTER SHUTOFF OF PRESSURIZATION SOURCE," granted on Oct. 9, 2018, which is incorporated by reference for any purpose.

When water is stagnant or unmoving in the pipes (i.e., there is no intentional water egress or leaks) in a situation with building movement, the temperature of water varies based on the temperature of where the water device 120 is installed and the temperature of the municipal water system 128 entering the building. Where the water device 120 is installed inside a building 112, for example, the temperature will stabilize at the ambient temperature typically regulated by a HVAC thermostat. On the other hand, if the water device 120 is placed outdoors it will vary as the weather changes over the course of the day. For small flows that are not detected by conventional flow sensors, there is a change in the temperature noted by the water device 120. Depending on the rate of water flow, the temperature measured by the water device 120 stabilizes at a certain temperature that is between the temperature of the municipal water system 128 and the temperature the plumbing system is exposed to in the building 112. Similarly, sloshing of water in the plumbing system 116 causes pressure and flow fluctuations that can be monitored by the water device 120. The water device 120 can measure these fluctuations in temperature, pressure and/or flow to detect movement of water in the attached pipe of the plumbing system 116.

Remote from the building 112 over the Internet 104 is a cloud analyzer 108 that is in communication with various buildings 112 and user devices 130. User account information, sensor data, local analysis, municipal water usage information for the building 112 is passed to the cloud analyzer 108. The cloud analyzer 108 could be hosted by a cloud provider or within an enterprise with various processors, databases and storage. User devices 130 may connect with the water device 120 and the cloud analyzer 108 through a local area network (LAN) 134 and/or a wide area or cellular network. The water device 120 can have an Ethernet, a broadband over power line, a WiFi, Bluetooth™, Zigbee™, Z-Wave™, and/or a cellular connection coupled to the network 134 and ultimately to the cloud analyzer 108 and/or user device(s) 130. Some embodiments include a gateway or peer node that the water device 120 can connect to that is coupled to the network 134 and/or Internet 104 using WiFi, Bluetooth™, Zigbee™, Z-Wave™ or other short range wireless signals. Generally, there is a gateway or firewall between the network 134 and the Internet 104 for buildings 112. Where there are multiple water devices 120 they can communicate directly with each other or through the network 134 or other LAN/WAN/PAN.

Within the building 112, the plumbing system 116 is a collection of pipes connected to appliances and fixtures that are all coupled to the water main 150. A building 112 may have one or more water device(s) 120 in fluid communication with the plumbing system 116. A water device 120 may be coupled to the cold and/or hot water pipe at a particular location, or coupled to any accessible faucet or other source of water, and wirelessly or wire communicates with the network 134. Portable water devices allow connection to the plumbing system 116 temporarily, for example, by connection to a spigot and turning on that egress point. Different water devices 120 may have different configurations with more or less sensors and processing capabilities. Some water devices 120 rely on peer communication to relay information to and from other water devices 120 while others have LAN and/or WAN capabilities.

Pressure in the plumbing system 116 can be analyzed with the water device 120 along with temperature, flow, movement, sound, etc. The municipal water system 128 is pressurized so that the plumbing fixtures dispense water when opened. The water main 150 into the building is typically at 80-120 psi. Buildings 112 buffer the water main pressure with a PRV to lower the pressure to 40-70 psi, which also bi-directionally isolates noise seen with sensors when connected directly to the water main 150. Within the building 112, temperature and pressure stabilize at a given rate of flow caused by leak or intentional egress from the plumbing system 116. Measuring with various sensors of the water device 120 allows detecting egress even for situations with a conventional flow sensor cannot perceive any usage.

The water device(s) 120 uses different techniques to find very small leaks in the plumbing system 116 that are not detected by a conventional flow sensor. For example, turbine flow meters do not sense below 0.7 gpm and ultrasonic flow sensors have resolution down to 0.1-0.2 gpm. Statistical approaches and signal processing techniques process temperature, pressure and/or other sensor readings for the leak detection by relying on variations of the temperature signal to provide first insights into the possibility of a leak with pressure and/or flow sensing optionally assisting in validating the likelihood of a leak in the plumbing system 116. Embodiments detect of leaks below 0.7 gpm and as low as 0.06 gpm in various embodiments.

Multiple point interface(s) 124 may or may not be in fluid communication with the plumbing system 116, but can gather data in some embodiments such as ambient temperature outside the plumbing system 116, temperature inside the pipe, water pressure inside the pipe, and/or acoustic waves inside or outside the pipe. The point interfaces 124 are coupled to the network 134 to provide input and output to the user device 130 with an interface, and/or could use peer connection with other point interfaces 124 and/or water devices 120 in various embodiments. The point interface 124 can be separate from the plumbing system 116 altogether while providing status on the water analysis system 100 such as instantaneous water usage, water usage over a time period, water temperature, water pressure, error conditions, etc. relayed from a water device 120. Error conditions such as leaks, frozen pipes, running toilets or faucets, missing or defective PRV, water bill estimates, low pressure, water heater malfunction, well pump issues, and/or other issues with the plumbing system 116 can be optionally displayed at the point interfaces 124 and/or user devices 130.

The user device 130 can be any tablet, cellular telephone, web browser, integral display, or other interface to the water analysis system 100. The water device(s) 120 is enrolled into a user account with the user device 130. Some or all of the information available at a point interface 124 can be made available to the user device using an application, app and/or browser interface. The user device 130 is wired or wirelessly connect with the water device(s) 120, cloud analyzer 108, and/or point interface(s) 124 using the LAN network 134, PAN or a WAN network.

The cloud analyzer 108 in this embodiment is able to ingest third party seismic measurements 142 using various databases over the Internet 104. Seismic measurements 142 are tied to particular locations and generally inferred from a few seismometers spread across the globe. The seismic measurements greater than a discernable threshold can trigger the cloud analyzer 108 to process data from the water devices 120 and point interfaces 124 to detect movement of water in their respective plumbing systems 116. With far more sensors than the third party seismometers, the analysis system 100 develops a more data rich seismic model for a given earth movement.

Leak detection in the municipal water system 128 is facilitated by the cloud analyzer 108. Various water devices 120 and point interfaces 124 can detect leaks outside the building 112. By recognizing a leak from multiple locations of the plumbing system 116, it can be determined if the leak is inside the building 112 or upstream from the building 112 looking back into the water main. Although not shown, sensor readings from multiple units and/or buildings allow further identifying where the leak might be in the municipal water system 128. Maps of the various pipes, valves, meters, etc. of the municipal water system 128 allow the cloud analyzer 108 to provide a location for the leak so that repair can remediate the leak.

Signal processing in the cloud analyzer 108 could determine the epicenter of an earthquake and propagation of the quake with movement and acceleration readings from the water in the pipe proximate to each sensor of temperature, pressure and/or flow. The signal processing can also identify leak signals. The sensor readings in the point interfaces 124 and water devices 120 are noisy with plenty of other signal not related to earth movement or upstream leaks, for example, intentional egress within the building or unit. When an earth movement or leak event is confirmed nearby, sensors in a cluster of uncoupled building can be analyzed to determine how earth movement or leak is reflected in the sensor data. Signal processing in the cloud analyzer 108 can filter out the noise over time as more confirmed earth movements and/or leaks are processed with actual sensor readings. For example, the orientation of the pipe with the sensor and plumbing system 116 will see different effect from the earth movement depending the direction of the earth movement.

Some buildings 112 tend to move in the absence of earth movement, for example, sway from wind or large vehicles passing nearby. The cloud analyzer 108 and/or water device 120 could determine that normal movement to develop a model used to filter out normal movement to reveal earth movement. When earth movement is suspected, sensor readings from adjacent or physically close buildings 112 can be used to confirm it was the earth moving and not normal building movements. Some embodiments could calibrate a model for each building 112 as each plumbing system 116 is unique. Each tremor can have its movement known in three-dimensional space which translate differently depending on the unique Cartesian bias in the plumbing system 116 and pipe adjacent to the sensor doing the reading. Over time, the response in the plumbing system for movement in any direction could be calibrated as each quake is characterized, for example the readings in a high rise would be different from a ranch house. Sensitivity of the readings from each plumbing system is different based upon the direction and intensity. A function could be customized for the data stream from each sensor to correct for the calibration model dependent on the direction, speed and acceleration of movement.

Some point interfaces 124 and/or water devices 120 can have sensors that detect noise associated with fracking of rocks correlated to earth movement. Earth movement may induce a charge or current in metal pipes that could also be detected with sensors in the point interfaces 124 and/or water devices 120. This allows early detection, but will post processing by the cloud analyzer 108 the epicenter and propagation radii is determined.

Pressure waves travel through water at some four times the speed of sound so pressure is transmitted quickly even where plumbing systems 116 make a large number of turns in complex branching routes. Pressure waves are a signal that sends earth movements quickly. In one embodiment, a deep pipe or well filled with water/hydrocarbons can transfer pressure signal to a sensor along the pipe and/or a more maintainable sensor on surface. Doppler algorithms using with multiple sensors could identify how deep the quake occurred. Some embodiments could use an existing well bore hole or pipeline. Surface sensors generally get attenuated signals because of propagation attenuation in solid earth rather than liquid. Liquid is high-speed communication mechanism along these water pipes that function independently from a sensor that digitizes a signal and sends it electronically.

The cloud analyzer 108 and/or water device 120 can automatically turn off water if earthquake is large enough to exceed a predetermined threshold for possible plumbing system 116 damage. Depending on the age of the building, number of floors, type of pipe material, size of plumbing system and/or water pressure, the predetermined threshold can be adjusted up or down. In any event, the water device 120 can run diagnostics and more carefully look for leaks for some period of time after an earthquake event. Where damage is likely, the water main 150 could be shut off by the water device 120 while additional diagnostics are run. Leak detection algorithms are more accurate if the water supply is interrupted even though that could inconvenience the occupants for a few minutes. The water device 120 could be skeptical of events being leaks after a confirmed earth movement event for a period of time that would fade away in one embodiment. For example, leak tests could happen at a 10 second interval, then 30 a second interval, then a one minute interval, then a 2 minute interval, then a 5 minute interval, then a 10 minute interval, etc. until a normal frequency of leak testing is achieved.

When detecting upstream leaks, the cloud analyzer 108 can activate a shut off valve for the plumbing system 116 to determine if the leak is within the plumbing system 116 or outside the building 112 or unit. By activating different shut off valves for different buildings, algorithms in the cloud analyzer 108 can determine more precisely where the leak might be. For example, a neighboring unit in the a building 112 might have the leak and by activating the shut off valve for the neighboring unit, it can be confirmed that the leak is there and not elsewhere.

The water devices 120, point interfaces 124 and other sensors could go into high-report mode once something is sensed that could be building movement or a leak to report much more often than normal. Generally, much building movement is treated as noise and filtered, but when in high report mode is active, the filtering algorithms could flush out the data to be suspicious of everything with more resolution. If it is determined that leaks in the plumbing system 116 are unlikely, the cloud analyzer 108 or independently the water device 120 could stop high-report mode. High-report mode could overwhelm the cloud analyzer 108 and or the network connection used. The cloud analyzer 108 may selectively put water devices 120 and or point interfaces 124 in high-report mode to not overwhelm processing and routing resources. Normally, a water device might take 2-4 seconds to report water movement, but in high report mode that period may be decreased to 200 ms, 500 ms, 1 sec, 2 sec, 3 sec, or any increment faster than the normal report period. In some embodiments, the cloud analyzer 108 could turn off other utilities, heaters, air conditioners, lights, and/or appliances if the earthquake is determined likely to cause damages to those systems. For building movement from tectonic plate shift having a violent jolt versus rolling or wave motion can be handled differently according to the likelihood damage would occur. Learning algorithms trained by leakage after earthquakes could be used to determine the remedial action to take.

Detection of earth movement by the cloud analyzer 108 or reports of seismic measurements could start a process of notification to user devices 130 and point interfaces 124 according to the likelihood there is an issue at the location of the building 112. Where to start the notification and remediation can be analyzed remotely to find the epicenter. In some embodiments, this detection can be reported to the user devices 130 and point interfaces 124 prior to the earth movement reaching a building 112. The water main 150 could be shut before damage might occur.

Figure 1C:
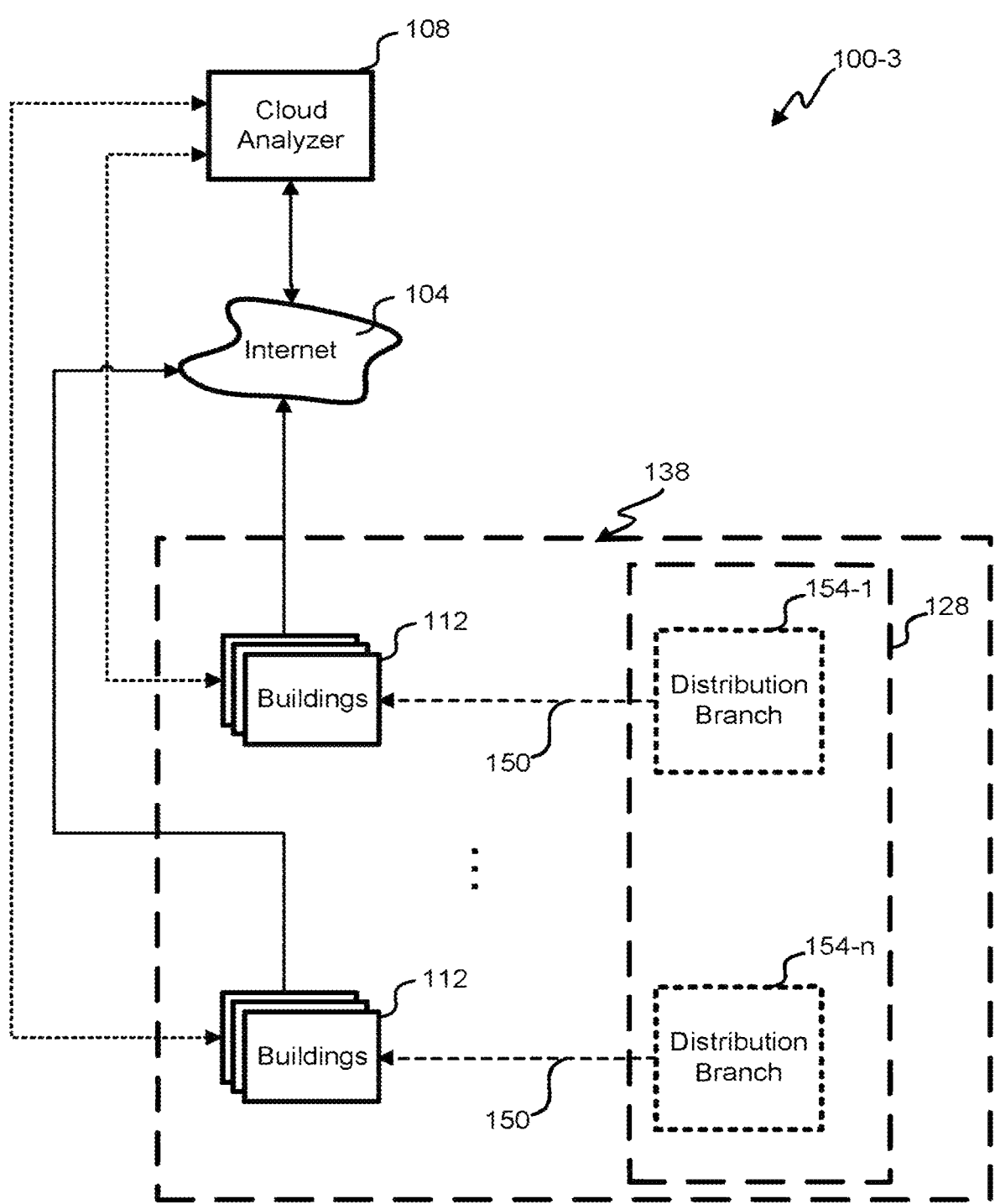

Referring to FIG. 1C, a block diagram of an embodiment of a water analysis system 100-3 is shown. The municipal water system 128 has a number of distribution branches 154 that service different groups of buildings 112 for a given municipality 138. The utility or municipality that provides the municipal water system 128 has maps of the distribution branches 154 and knows how water is piped to each building 112. For each distribution branch 154 there can be valves, flow meters and other equipment to control the delivery of water to buildings 112.

Figure 2:
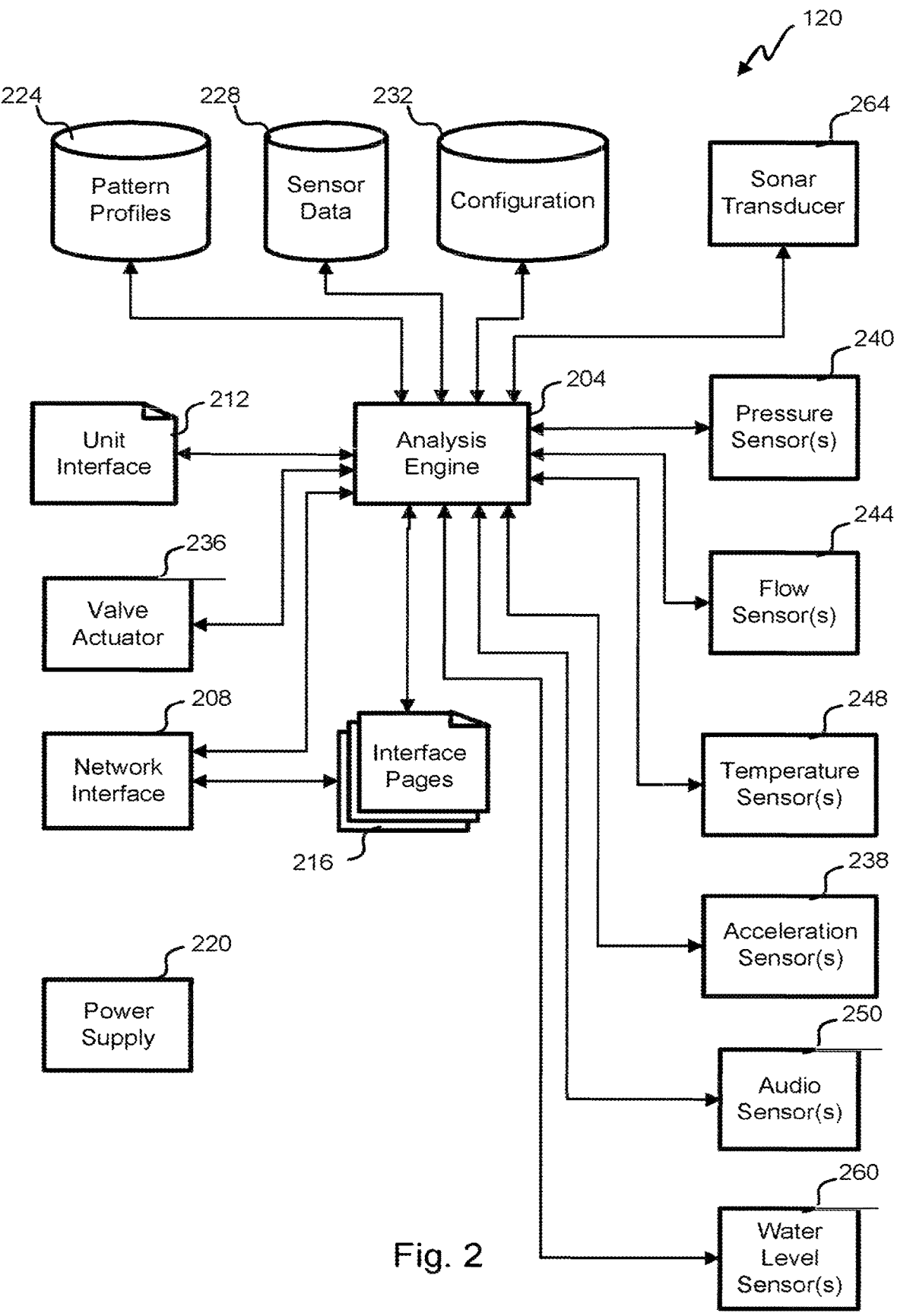
FIG. 2 illustrates a block diagram of an embodiment of a water device.

With reference to FIG. 2, a block diagram of an embodiment of a water device 120 is shown. Different versions of water device 120 can have fewer components, for example, a water device 120 at an egress point or fixture can have pressure and temperature sensors 240, 248 or any other subset of sensors with a network interface 208 to relay that information to another water device 120 for processing. A power supply 220 could be internal or external to the water device 120 to provide DC or AC power to the various circuits. In some embodiments, a replaceable battery provides power while other embodiments use the water pressure to drive a turbine that recharges a battery to provide power without using grid power.

Some water devices 120 include a valve actuator 236 that operates a shut-off valve suspending flow from the water main 150. If there is a leak detected or testing is performed, the valve actuator 236 can be activated to prevent further consumption of water from the municipal water system 128. In some embodiments, the valve actuator 236 can partially constrict the water flow to change the water pressure in the building 112. Modulating the water pressure with the valve actuator 236 allows introduction of pressure waves into the plumbing system 116. The modulation can be read by other water devices 120 or point interfaces 124 in the same unit or a neighboring unit. The reading of upstream pressure changes can be determined for each water device 120 or point interfaces 124.

An analysis engine 204 gathers various data from the pressure sensor(s) 240, flow sensor(s) 244, temperature sensor(s) 248, and audio sensor(s) 250, sonar transducer 264, and/or water level sensor(s) 260. In one embodiment, the analysis engine 204 is implemented with a micro controller, processor and/or other support circuitry. Interface pages 216 provide for interaction with the water device 120 through a network interface 208 in a wired or wireless fashion with the user device(s) 130. The analysis engine 204 also supports a unit interface 212 that is physically part of the water device 120 or located remotely to display various status, information and graphics using an OLED, LED, LCD display and/or status lights or LEDs. The analysis engine 204 can detect building movement, intentional egress and leak detection both within the building 112 and upstream too.

Various information is stored by the water device 120, which can be reconciled with the cloud analyzer 108 in-whole or in-part using the network interface 208 coupled with the LAN network 134 or the Internet 104 using a cellular modem. Sensor data for the various sensors 238, 240, 244, 248, 250, 260, 264 are stored in the sensor data store 228 over time to provide for longitudinal analysis. For example, several hours through several days of sensor data can be stored. The granularity of readings and length of time stored may be predefined, limited by available storage or change based upon conditions of the plumbing system 116. For example, data samples at a one second interval over a two day period could be stored, but when a leak is suspected the sample rate could increase to sixty times a second for four hours of time. Other sample rates are possible if a likely leak situation is determined. Various report rates to the cloud analyzer 108 are possible with detected egress causing a report or the reports can be accumulated until a periodic report back period.

When fixtures or appliances interact with the water in the plumbing system 116, recognizable patterns occur at the water device 120. Pattern profiles 224 are stored to quickly match current sensor readings to known events. For example, a particular faucet when used may cause the flow, pressure, acceleration, and/or temperature sensor 244, 240, 238, 248 readings to fluctuate in a predictable manner such that the pattern profile can be matched to current readings to conclude usage is occurring at a particular egress point. U.S. Pat. No. 10,352,814, entitled "WATER LEAK DETECTION USING PRESSURE SENSING," granted on Jul. 16, 2019, describes this analysis and is incorporated by reference for any purpose. The pattern profiles 224 can be in the time domain and/or frequency domain to support various condition matching by the analysis engine 204. Both intentional egress and leaks have pattern profiles 224 that are stored. Audio patterns and sonar patterns captured respectively from the audio sensor 250 and sonar transducer 264 are also stored as pattern profiles 224. The sonar transducer 264 can also emit bursts or pulses into the water at different frequencies, amplitudes and durations stored with the other pattern profiles 224. The sonar transducer 264 can also operate as a microphone to listen to reflections of the signals sent or from other water devices 120 in lieu of the audio sensor 250 or in addition to the audio sensor 250. Some pressure sensors are sensitive to the 120 Hz or lower spectrum to also act as a sonar microphone. The audio sensor(s) 250 could be coupled to the water, pipes, appliances, fixtures, and/or ambient air in the building 112 in various embodiments.

A configuration database 232 stores information gathered for the water device 120. The Table illustrates water supply parameters stored in the configuration database 232. Type of plumbing system 116 includes those without a PRV, using well water, with a working PRV, and with a non-functional PRV. The water supply to the water main 150 can be from the municipal water system 128, a well, a water tank, and/or other source. The configuration database 232 can be automatically populated using algorithms of the analysis engine 204 or manually entered by the user device 130. Different fixtures and appliances connected to the plumbing system 116 are noted in the configuration database 232 as automatically determined or entered manually.

TABLE

| Water Supply | |
|---|---|
| Field | Options |
| Type | No PRV |
| | Well water |
| | Working PRV |
| | Non-Functional PRV |
| Supply | Municipal water |
| | Well |
| | Tank |

Some embodiments of the water device 120 could further include a digital compass and/or acceleration sensor 238. By knowing the orientation of the water device 120 with respect to a three dimensional space, the movement of the pipe measured with an accelerometer can be used to further refine the building movement. By knowing orientation, the movement of the earth causing the building movement can be further resolved. The accelerometer provides movement of the pipe and by implication the building and earth. The magnitude of acceleration correlates with the prevalence of damage to the plumbing system 116 and leaks. Additionally, pipes tend to move and rattle with changes in water flow. The acceleration sensor 238 can be used to predict water usage and egress.

The analysis engine 204 includes a timer that can be a combination of hardware and/or software. A GPS or other timing signal could be used to further improve time accuracy in some embodiments. When connected to a LAN or WAN, timing signals from the network can be used to further predict time accurately. Where propagation of earth movement is determined to hit a particular building, the timer can be corrected due to the accuracy of those movement curves. Some embodiments don't rely on enhancing timing with timing signals or earth movement, but report with whatever accuracy they have and those readings can be realigned remotely in the cloud analyzer 108 knowing location for the building 112.

Figure 3:
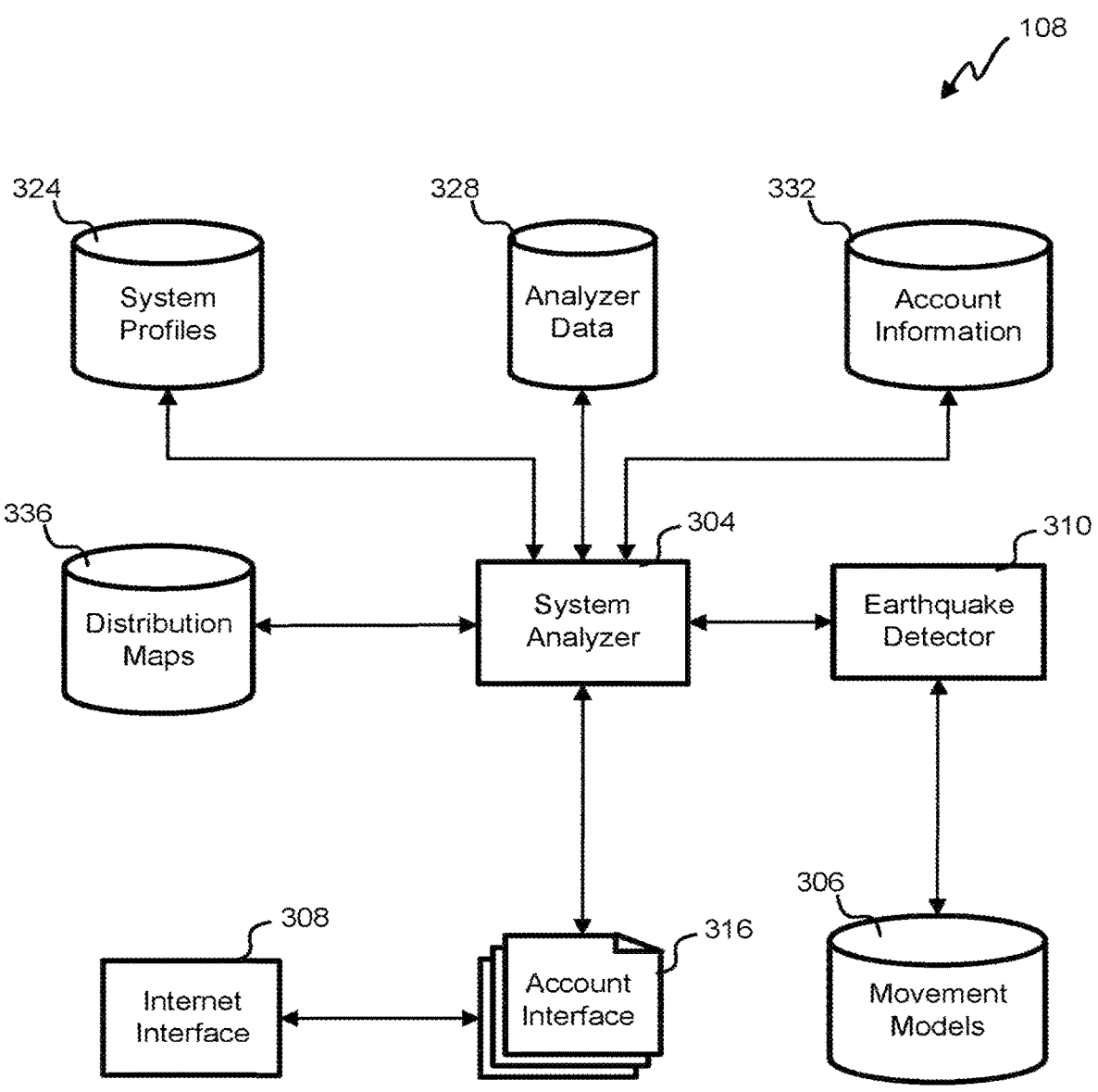
FIG. 3 illustrates a block diagram of an embodiment of a cloud analyzer.

Referring next to FIG. 3, a block diagram of an embodiment of a cloud analyzer 108 is shown. The cloud analyzer 108 receives data and configuration information from buildings 112 throughout the water analysis system 100. Each building 112 or unit thereof has a system profile 324 that is stored including the fixtures, appliances, water device(s) 120, point interface(s) 124, type of water supply, water source type, etc. are stored. Account information 332 including login credentials, building location, and/or user demographic information is also stored. Gathered sensor data in raw and processed form is stored as analyzer data 328 and could include usage history, specific egress events, leaks detected, fixture profiles, appliance profiles, etc.

The system analyzer 304 can process the data from each building 112 to find patterns corresponding to leaks, malfunctions, building movement, and other events that are not recognized by the water device 120 locally. By gathering sensor information from buildings 112, the system analyzer 304 can use machine learning and big data to find weak signals in the gathered sensor information across the analysis system 100. The system analyzer 304 can access any water device 120 or point interface 124 to test functionality, update software, change algorithms, reporting periodicity, and/or gather data. Where a user device 130 is coupled to the cloud analyzer 108, the system analyzer 304 receives commands to perform requested tasks from users. For example, the user device 130 can query for usage on a per fixture or appliance basis. Overall usage by the plumbing system 116 in the associated building 112 can also be determined. The system analyzer 304 can access the water utility usage and billing to provide insights into costs and overall consumption. For those utilities that provide usage information in real time, the usage and cost can be determined for each use of the plumbing system 116.

An account interface 316 allows various water devices 120 and user devices 130 to interact with the cloud analyzer 108 through an internet interface 308. The cloud analyzer 108 provides historical and real time analysis of buildings 118 a user is authorized to access. Various interaction pages of the account interface 316 allows entry of plumbing system information, configuration parameters, building location, building configuration and age, and/or user demographic information to populate the account information 332. Various reports and status parameters are presented to the user device 130 through the account interface 316.

This embodiment of the cloud analyzer 108 includes an earthquake detector 310 that uses movement models 306 for plumbing systems 116 for the buildings 112 of the water analysis system 100. Movement models 306 have a three dimensional function that translates building movement and acceleration to readings for the water device 120 coupled to the plumbing system 116. Over time, the earth movement is discerned along with the reaction measured by the water device 120.

When an earthquake is suspected, the movement model 306 for the building is used to transform sensor readings into likely building movement by the earthquake detector 310. Readings from across the water analysis system 100 are used to determine a likely earthquake situation. Once the earthquake detector 310 finds a possible earthquake, it is geographically analyzed to determine where sensor readings might validate the presumption. The system analyzer 304 may put individual water devices into high report mode or selectively query those to more quickly to detect the earthquake and characterize its magnitude and likelihood to cause plumbing leaks across a geography. If detected, water devices 120 can be put into a more sensitive mode to detect leaks or even shut off the water main 150 before damage could occur. Local testing or better characterization of the earthquake can be performed before returning to normal operation after the earthquake ends. Some embodiments have leak risk models stored that are different based upon the size of the plumbing system 116, type of water source, floor of building, age of building, pipe material, etc. to be more or less suspicious of a leak or take remedial action.

The system analyzer 304 has access to distribution maps 336 that give pipe locations for the municipal water systems 128 for a multitude of municipalities 138. Various water devices 120 can be used to detect upstream leaks. The system analyzer 108 can determine where on the distribution map 336 the leak is located. Leaks of different severity can be cataloged and reported to the municipality 138 for repair. Active pressure wave injection with transducers, closing of distribution valves, activating building shut-off valves, adding portable water devices 120, and other mechanisms can be performed by the system analyzer 304 assist in locating a leak in the municipal water system 128. Service workers can assist in some of the activities requiring manual operations, for example, a service worker can install a transducer or portable water device. U.S. application Ser. No. 16/230, 775, entitled EGRESS POINT LOCALIZATION, filed Dec. 21, 2018 gives additional detail on portable water devices and is incorporated by reference herein for any purpose.

Figure 4:
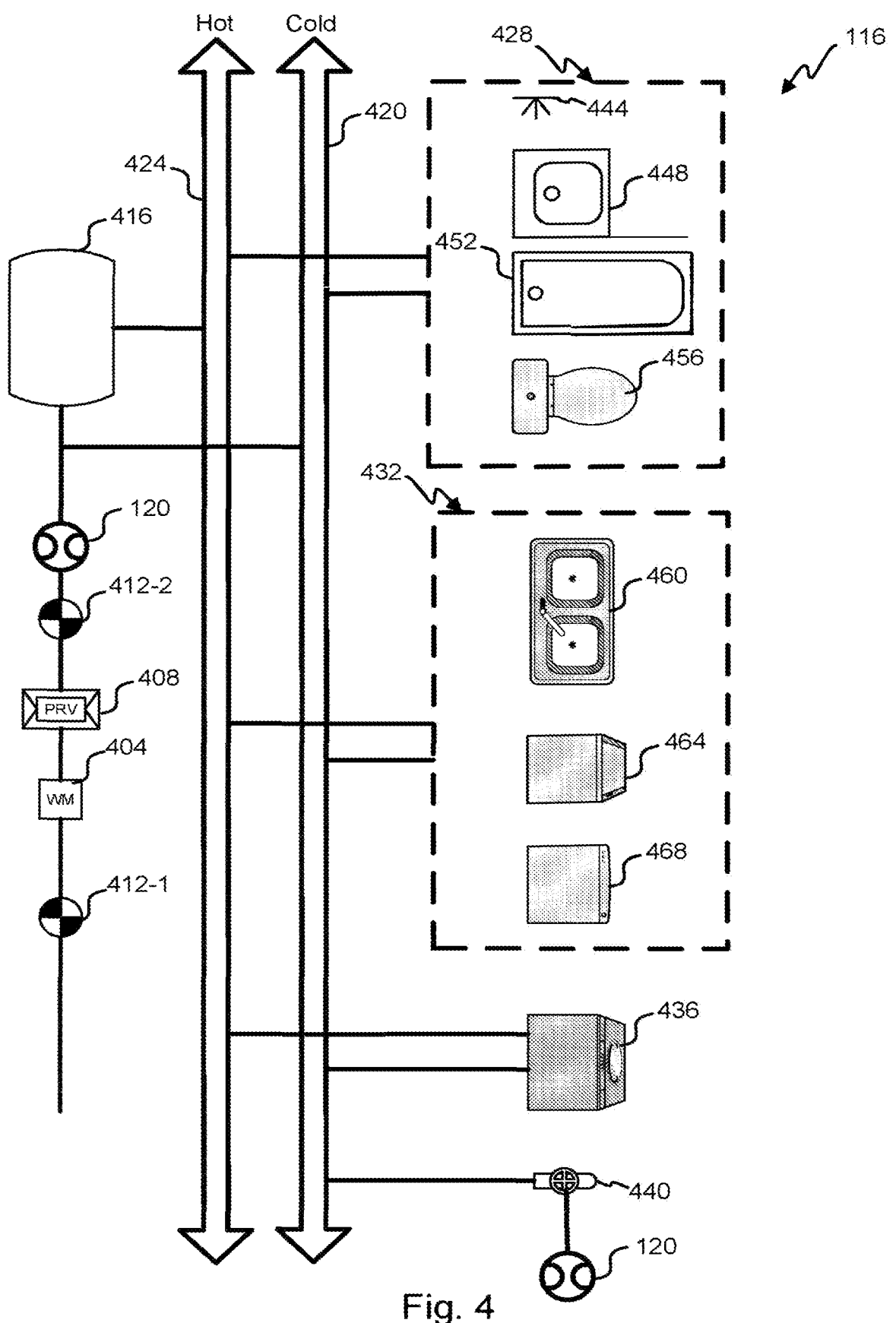
FIG. 4 illustrates a block diagram of an embodiment of a plumbing system.

With reference to FIG. 4, a block diagram of an embodiment of a plumbing system 116 is shown. The municipal water system 128 is connected to a main shutoff valve 412-1 before the water main 150 passes through a water meter 404 provided by the municipality for billing purposes. The water meter 404 may be electronically or manually read to determine the bill, but some embodiments have real time reading of the water meter 404 electronically over a WAN or LAN.

Building codes often specify use of a PRV 408, but not universally. Older homes may also be missing a PRV, have one that no longer functions properly or have less than 80 psi supplied by the municipal water system 128. A building shutoff valve 412-2 is often located interior to the building 112 and provides another place to close off the water main 150. A water device 120 is located after the building shutoff valve 412-2, but before a water heater 416 in this embodiment. The water device 120 can be placed under the sink, near an appliance or any other location where fluid coupling is convenient with a source of power nearby.

In this example, a portion of a water line may be removed, such that the water device 120 may be installed in-line with the water line. Alternatively, the water device 120 can be coupled to a fixture 440 through which water can flow, such as a water spigot or faucet. In other embodiments, the water device 120 is integrated into the water meter 404. The hot water pipes 424 provide heated water to the building 118 and the cold water pipes 420 provide unheated water varying between the ambient temperature in the building 112 and the temperature of the municipal water system 128. The hot water pipes 424 may include a circulation pump. The hot and cold water pipes 424, 420 could branch and split in any configuration as they are fed through the walls and floors of the building 112. In some embodiments, a water device 120 configured to couple to a hot and cold line at a given location has independent sensors for each line that take various readings.

This embodiment has a single bathroom 428, a kitchen 432, a washing machine 436, and a water spigot 440, but other embodiments could have more or less fixtures and appliances. The bathroom 428 has a shower 444, sink 448, bathtub 452, and toilet 456 that use water. The sink 448, bathtub 452, and shower 444 all hooked to both the hot and cold water pipes 424, 420. The toilet 456 uses cold water so is not hooked to the hot water pipes 424. Other buildings 112 could have any number of egress points from the plumbing system 116.

The kitchen 432 includes a two-basin sink 460, a refrigerator 464 with a liquid/ice dispenser, and a dishwasher 468. The refrigerator 464 receives cold water 420, but the two-basin sink 460 and dishwasher 468 receive both cold and hot water pipes 420, 424. Kitchens 432 commonly include single-basin sinks and other appliances that might be coupled to the water. A typical building 112 has hundreds or thousands of pipes branching in different directions.

Figure 5:
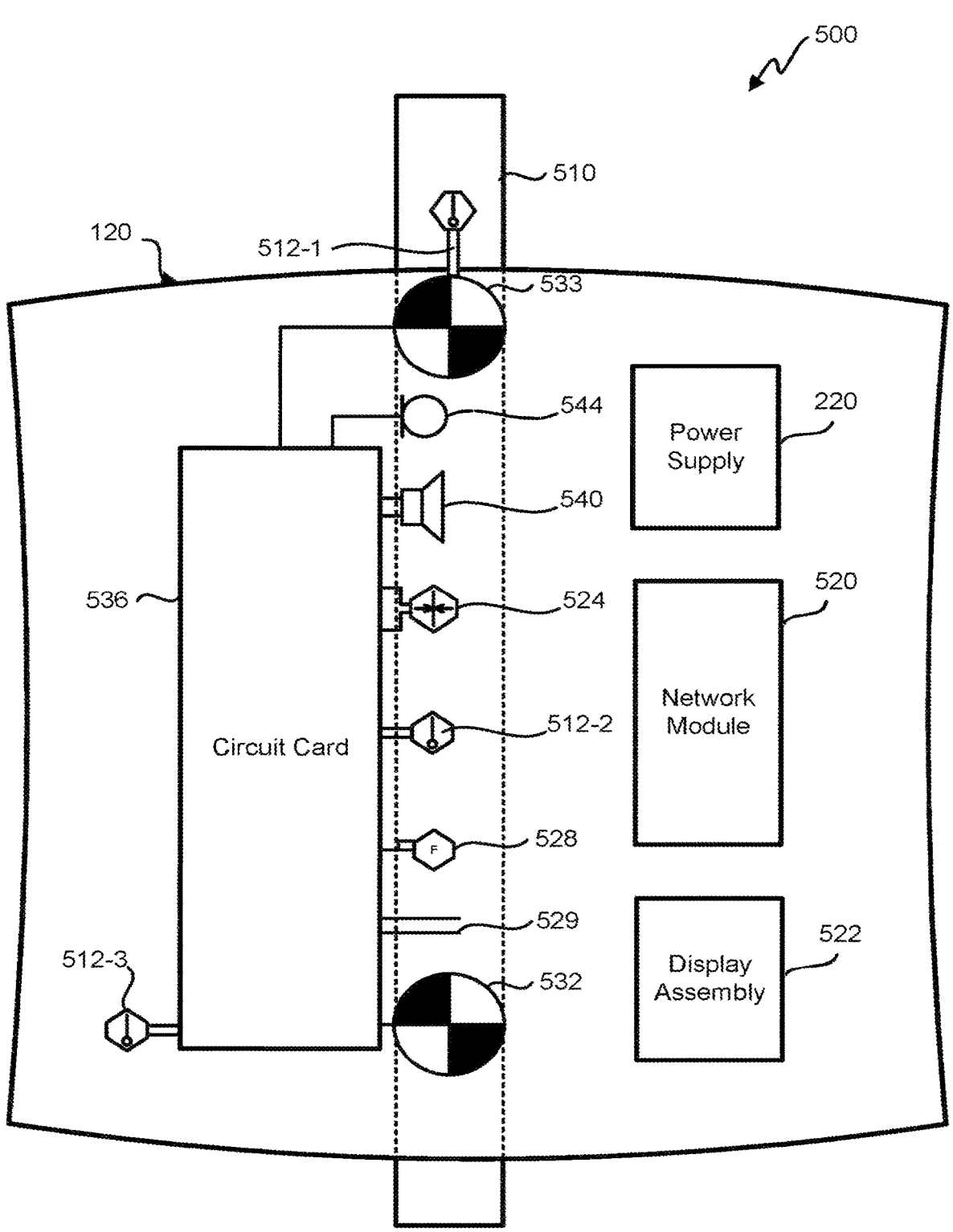
FIG. 5 illustrates a block diagram of an embodiment of an installed water device.

Referring next to FIG. 5, a diagram of an embodiment of a water device 500 is shown. The water device 120 may pass water through a pipe 510 that is integral to the water device 120. The pipe 510 may be attached on both ends to either a hot or a cold water line 424, 420. Alternatively, the top of the pipe 510 may be connected to an adapter for a faucet or other fixture. Some embodiments of the water device 500 couple to both a hot and cold line near an egress point to have two sets of sensors to independently measure each. The integral portion of the pipe 510 could be made of copper, PVC, plastic, or other building pipe material and could be mated to the plumbing system 116 with soldered joints, glued joints, and/or detachable and flexible hoses in various embodiments.

There are several modules that make up the water device 120. A power supply 220 powers the water device 120 and could be internal or external to the enclosure. A network module 520 includes the network interface 208 for wired or wireless communication with the network 134 and Internet 104 to other components of the water analysis system 100. A display assembly 522 includes the unit interface 212.

Another module is the circuit card 536 which performs the processing for various sensors. Sensor information can be processed on the circuit card 536 using the analysis engine 204 and/or processed in the cloud using the system analyzer 204. Sensor information is gathered and analyzed over hours and days to find weak signals in the data indicating usage, leaks and other issues. The circuit card 536 might recognize sensor samples of interest and upload those to the cloud analyzer 108 for deep learning of the sensor data. The circuit card 536 and cloud analyzer 108 can use artificial intelligence, genetic algorithms, fuzzy logic, and/or machine learning to recognize the condition and state of the plumbing system 116.

This embodiment includes three temperature sensors 512 to measure the ambient temperature with a temperature sensor 512-3 near the outside of the enclosure and away from the internal electronics and water temperature of the water in the pipe 510 in two locations. A first temperature sensor 512-1 measures water temperature in contact with the water as it enters the pipe 510 of the water device 120 away from any heat that the various circuits might generate. A second temperature sensor 512-2 measures water temperature at a second location within the pipe 510 and away from the first temperature sensor 512-1. Based upon readings of the two water temperature sensors 512-1, 512-2, the heat generated by the water device 120 is algorithmically corrected for. A third temperature sensor 512-3 measures the ambient temperature outside of the pipe 510. Other embodiments can use a single water temperature sensor and/or forgo the ambient temperature sensing. Ambient temperature may be measured by other equipment in the building and made available over the network 134, for example, the thermostat, smoke detectors, other water devices 120, and/or point interface(s) 124 can measure ambient temperature and provide it to other equipment in the building 112. Some embodiments could have a temperature sensor outside the building 112 or gather that information from local weather stations over the Internet 104.

This embodiment includes an electronically actuated shutoff valve 532. The shutoff valve 532 can be used to prevent flooding for leaks downstream of the water device 120. Additionally, the shutoff valve 532 can aid in detecting leaks. For example, the shutoff valve 532 and detecting a falling pressure is indicative of a leak downstream. Some embodiments can partially close the shutoff valve 532 to regulate pressure downstream. A one-way valve 533 may also be provided to regulate water flow into the pipe 510 and force it to flow in one direction.

A flow sensor 528 is used to measure the motion of water in the in the pipe 510. In this embodiment, an ultrasonic flow sensor is used, but other embodiments could use a rotameter, variable area flow meter, spring and piston flow meter, mass gas flow meters, turbine flow meters, paddlewheel sensors, positive displacement flow meter, and vortex meter. Generally, these meters and sensors cannot measure small flows in a pipe in a practical way for building deployments. A plurality of electrodes 529 including a reference electrode and a measurement electrode may be provided within the pipe 510 to indicate a water level within the pipe 510.

This embodiment includes a sonar emitter 540 that produces sound tones, pules and/or bursts at different frequencies. A sonar microphone 544 receives sonar signals from the water in the pipe 510. Reflections from the various branches of the plumbing system 116 will produce reflections of different amplitude and delay according to the length of travel and other factors. When there are blockages in the plumbing system 116 from valves, clogs and/or frozen pipes, the echoes from the sonar emissions are received by the sonar microphone 544. Changes in the time delay between transmission and receiving of sonar signals indicate blockage or other changes in the plumping system 116. Other embodiments may combine the sonar emitter and microphone with a single sonar transducer.

Some embodiments have movement sensors such as a gyroscope or accelerometer. Vibration and movement of the pipe 510 allows detecting egress and building movement. These movement sensors detect both movement and acceleration, which allows detection of earthquakes or other events that might correspond to a higher probability of a leak forming. The circuit card 536 can differentiate normal pipe movement from egress events, sound waves and other normal background vibration, from movement likely to be from the building. Where there are multiple water devices 120 in the same building, building/earth movement noise can be filtered from egress related movement.

The circuit card 536 is connected with a pressure sensor 524, which is coupled to the water in the pipe 510. Readings from the pressure sensor 524 are used to test the PRV 408, well pump, water supply, freeze conditions, and pipe for leaks as well as identify normal egress from the water fixtures and appliances. Pressure and temperature vary with flow such that the pressure sensor 524 and temperature sensor 512-1, 512-2 can be used to detect flow as small as tiny leaks under certain circumstances. The circuit card 536 observes trends in the sensor data, performs spectral analysis, pattern matching and other signal processing on the sensor data. U.S. Pat. No. 10,527,516, entitled "PASSIVE LEAK DETECTION FOR BUILDING WATER SUPPLY," granted on Jan. 7, 2020, describes how to use the water device 500 to detect and characterize small leaks, and is incorporated by reference for any purpose.

Figure 6:
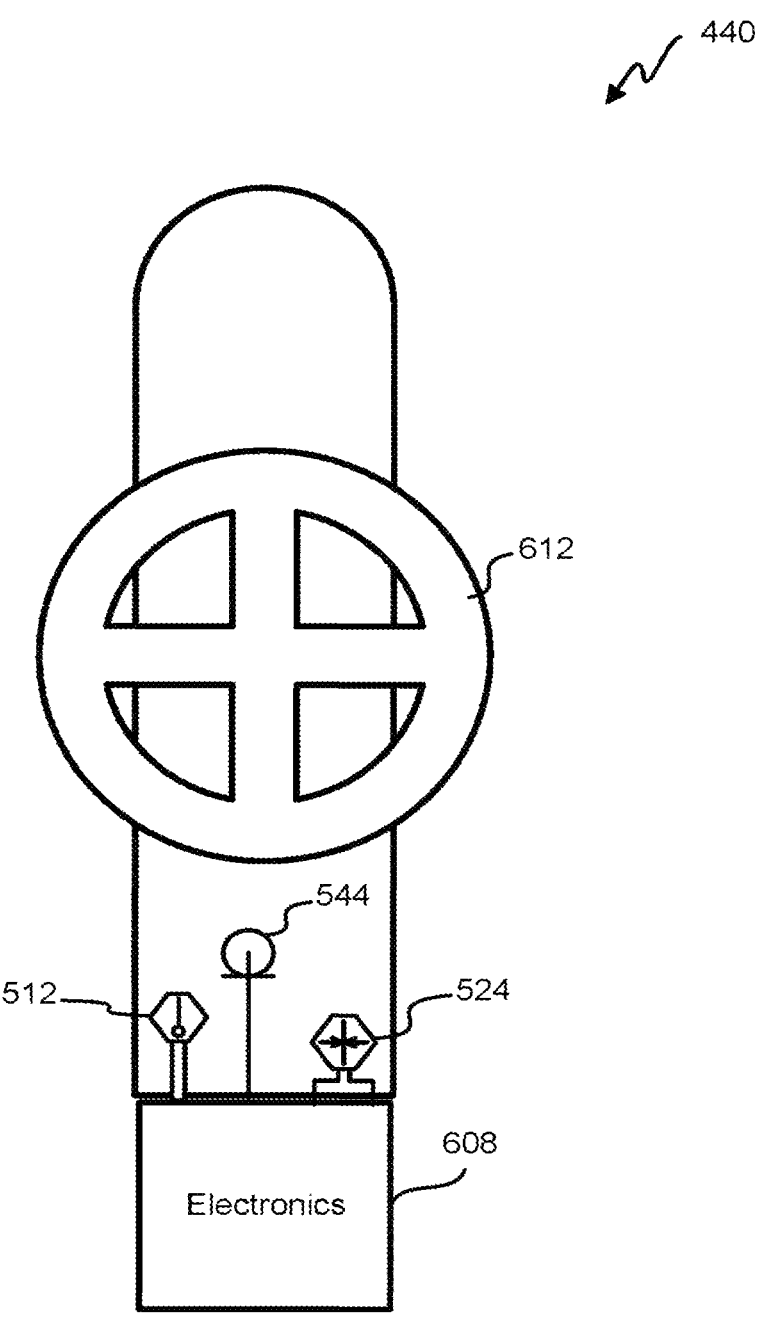
FIG. 6 illustrates a block diagram of an embodiment of a water fixture that is fitted with integral sensors.

Referring next to FIG. 6, an embodiment of water fixture 440 is fitted with integral sensors to provide some of the capability of the water device of FIG. 5. An electronics module 608 includes a network interface for LAN and/or WAN communication along with circuitry to operate sensors and process or partially process the resulting readings. This embodiment includes a temperature sensor 512, pressure sensor 524 and a sonar microphone 544, but other embodiments could include more or less sensors. For example, some embodiments include a sonar emitter or a combination pressure and temperature sensor. The water fixture 440 could have other electronic features such as adjusting the egress flow to override a manual knob 612 or mixture of hot and cold water to adjust the temperature of water exiting the water fixture 440. Some embodiments could have sensors on the hot and cold input pipes to measure separately prior to egress.

Figure 7:
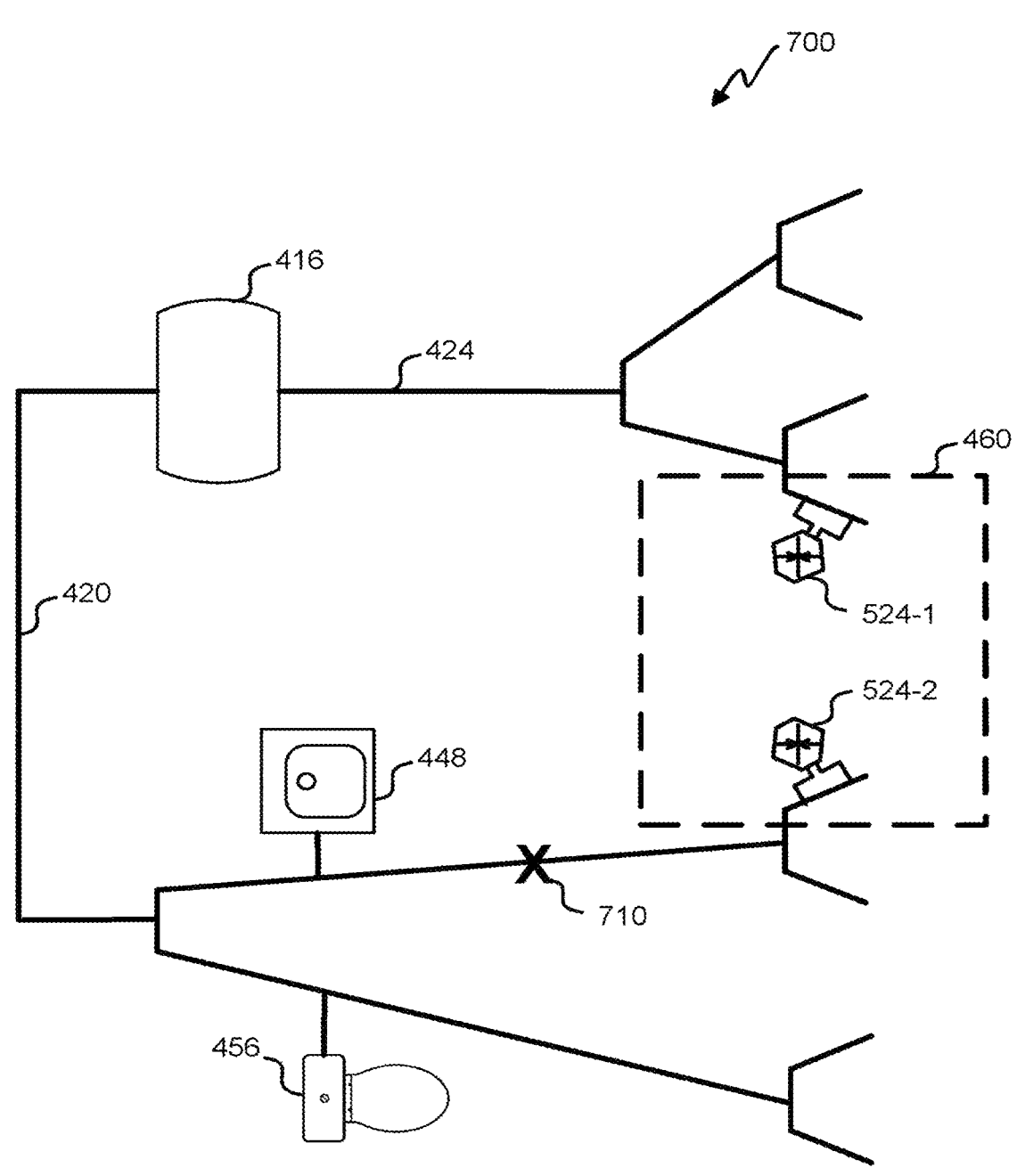
FIG. 7 illustrates an embodiment of a portion of a plumbing system with two flow sensors on different branches.

With reference to FIG. 7, a block diagram of an embodiment of portion 700 of a plumbing system is shown. The plumbing system portion 700 may include the water heater 416, which is coupled to the hot water pipe 424 and the cold water pipe 420. Each of the hot water pipe 424 and the cold water pipe 420 branches off throughout the plumbing system 116. For simplicity, FIG. 7 shows a portion 700 of the fixtures that may be included in the plumbing system 116 shown in FIG. 4. Specifically, FIG. 7 shows the sink 460 in the kitchen 432, the toilet 456 in the bathroom 428, and the sink 448 in the bathroom 428. Although one water device 120 is shown, the plumbing system 700 may include any number of water devices 120, point interfaces 124, and/or water fixtures. The plumbing system 700 may also include any number of temperature sensors, pressure sensors, audio sensors, flow sensors, transducers, accelerometers, and/or microphones.

A first pressure sensor 524-1 may be affixed to a branch of the hot water pipe 424 underneath the sink 460 in the kitchen 432. The first pressure sensor 524-1 may be a standalone component, or may be integrated within the water device 120, point interface 124, and/or the water fixture 440. A second pressure sensor 524-2 may be affixed to a branch of the cold water pipe 420 underneath the sink 460 in the kitchen 432. The second pressure sensor 524-2 may be a standalone component, or may be integrated within the water device 120, point interface 124, and/or the water fixture 440. The first pressure sensor 524-1 and the second pressure sensor 524-2 may be affixed to any segment of the hot water pipe 424 and the cold water pipe 420, respectively, in the larger plumbing system 116. The first pressure sensor 524-1 and the second pressure sensor 524-2 can be affixed to any separate locations within the plumbing system 116, provided that there is at least one branch point between the locations. The first pressure sensor 524-1 and the second pressure sensor 524-2 may be configured to determine an estimated location of an egress point, such as a leak 710 within the plumbing system 116 or the opening of a fixture within the plumbing system 116.

Some embodiments could use any other sensor or set of sensors to detect flow as the first and second sensors 524, for example, acceleration, sound, temperature, flow, and/or pressure sensors. Water devices 120 or point interfaces 124 could be used to measure the water in the two places of the plumbing system 116. With sensors in two locations, noise from the water main 150 upstream from the plumbing system 116 can be isolated. Using differential times, it can be determined if sensed egress or other disturbance is up stream of the PRV 408 or water device 120. For example, if a water device 120 close to the water main 150 senses something 20 ms prior to another water device 120 mounted under the kitchen sink, the signal is noise from the municipal water system 128, for example, egress at a neighbor's house. This noise can be isolated and removed from the signal processing in the water devices 120 in a building 112 to improve measurement and isolation determinations. U.S. application Ser. No. 16/230,775, filed Dec. 21, 2018, entitled Egress Point Localization, provides additional description of localization of water activity and is incorporated herein for any purpose.

Figure 8A:
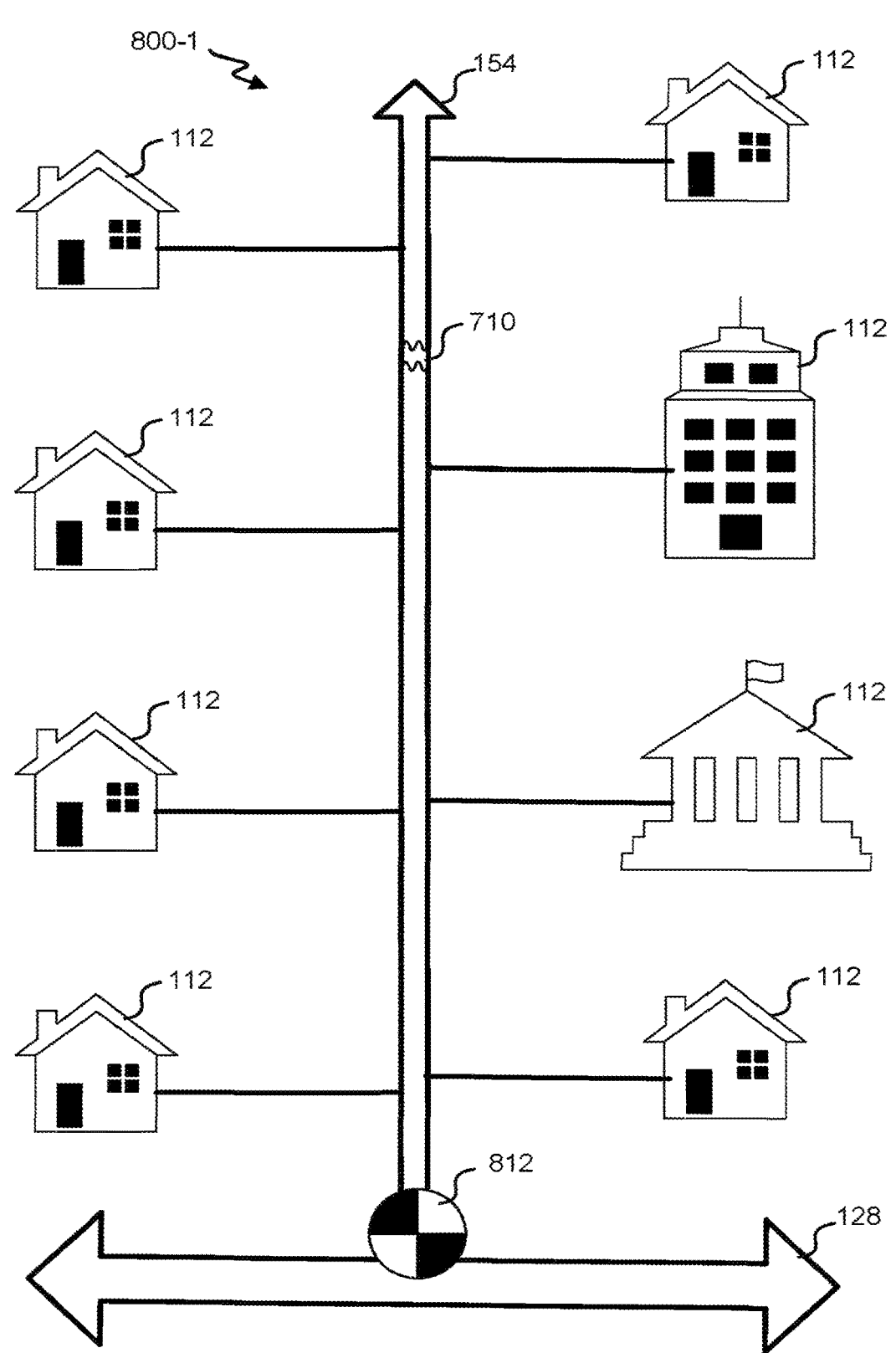
FIGS. 8A and 8B illustrate block diagrams of embodiments of a water analysis system.

Referring next to FIG. 8A, a block diagram of an embodiment of a group analysis system 800-1 is shown. There are a number of buildings 112 of different types that are grouped by the particular distribution branch 154 of the municipal water system 128 their water mains 150 are connected to. There is a leak 710 in the distribution branch 154. Using water devices 120 in the various buildings 112, the leak 710 can be detected and the location approximated using distribution maps 336.

Figure 8B:
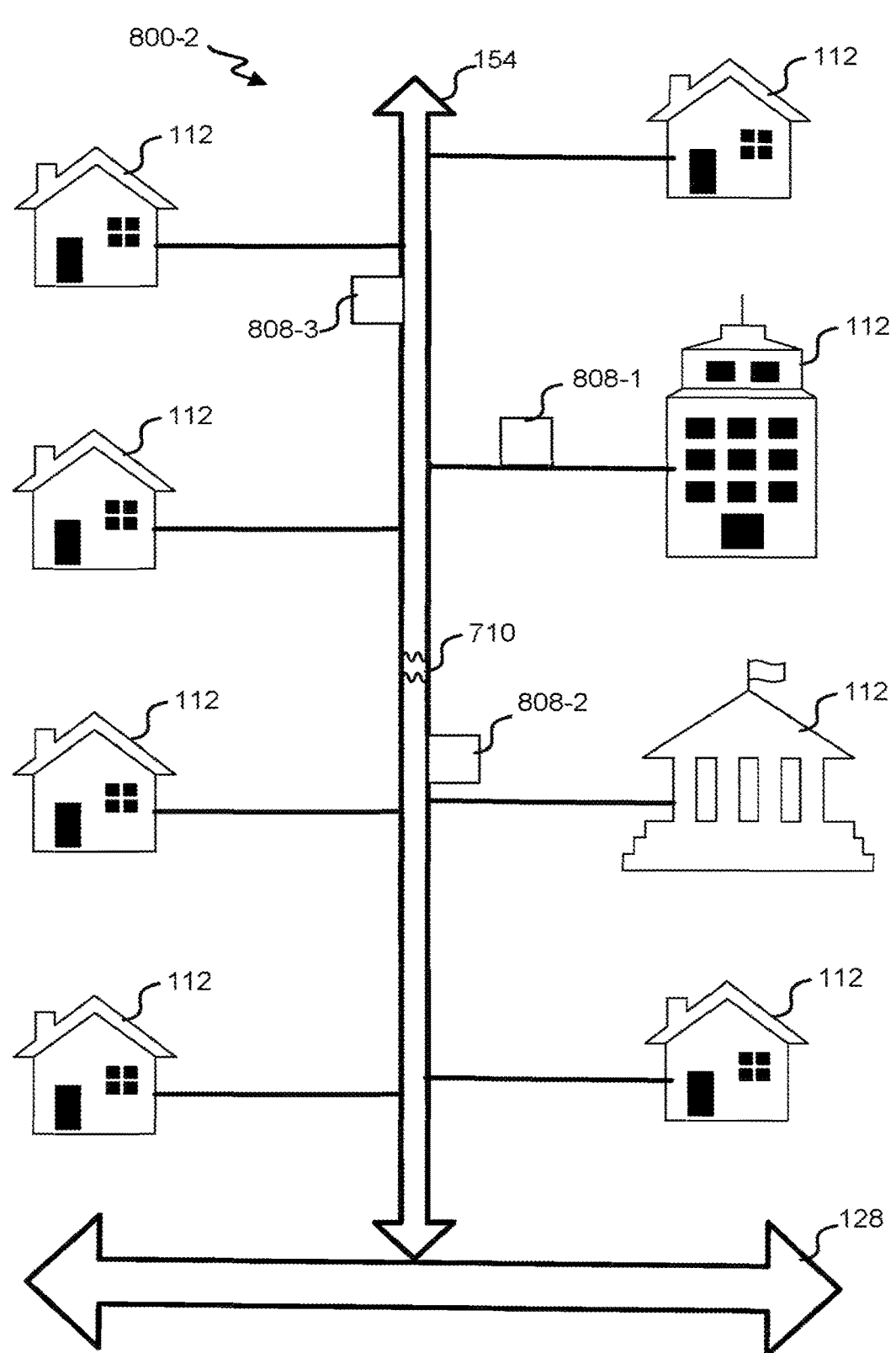

Referring next to FIG. 8B, a block diagram of another embodiment of a group analysis system 800-2 is shown. In this embodiment, three pressure transducers 808 are used to inject a sound or pressure signal into the pipes. The location of the pressure transducers 808 are known. The water devices can calibrate against the one or more pressure transducers 808 to gain better accuracy in finding the leak 710. The three pressure transducers 808 can inject a unique signal different from each other so that each water device 120 can disambiguate them from each other. The signals may have a different frequency or separated in time to allow recognizing each independently.

Figure 9A:
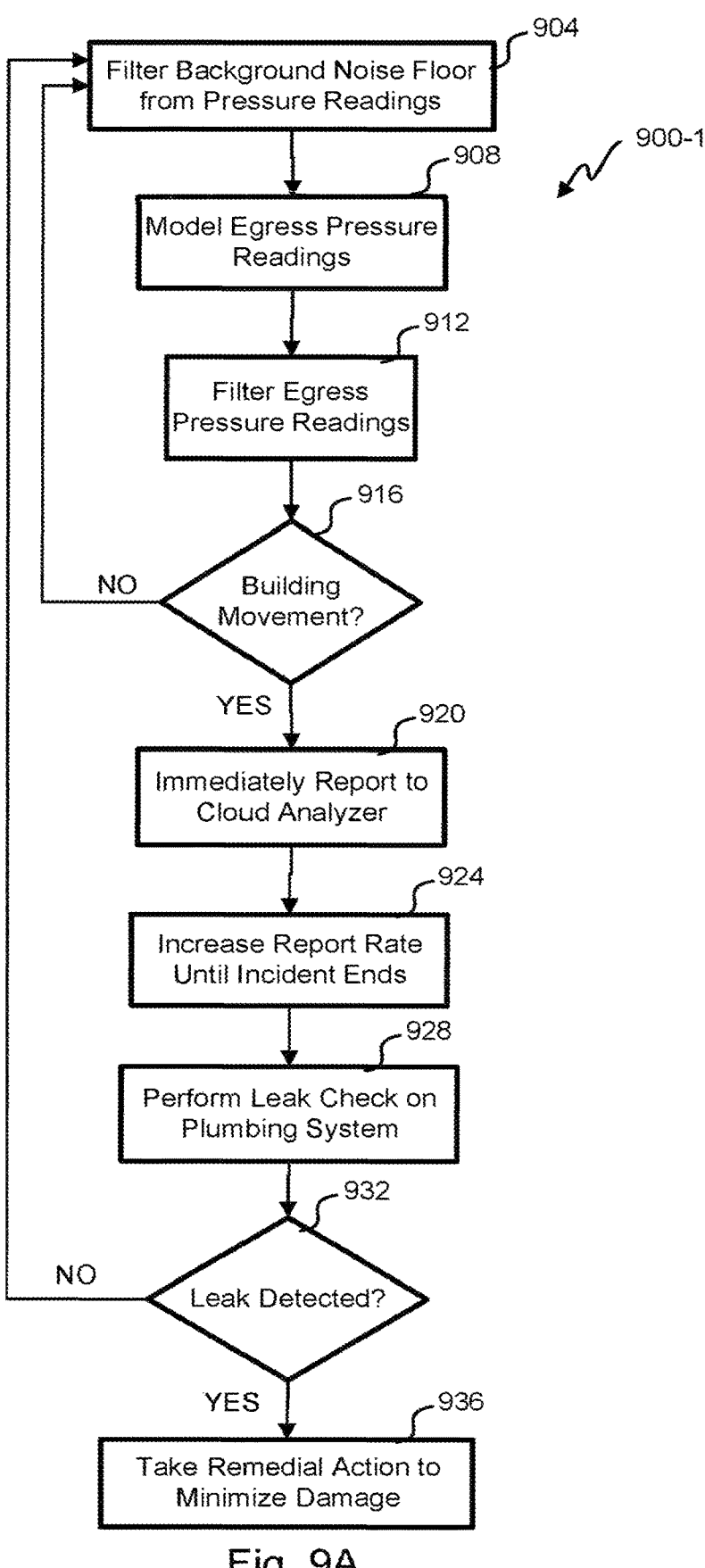
FIGS. 9A-9C illustrate flow charts of embodiments of methods for detecting and remediating building movement.
Figure 9B:
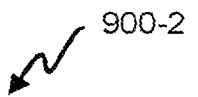
Figure 9B:
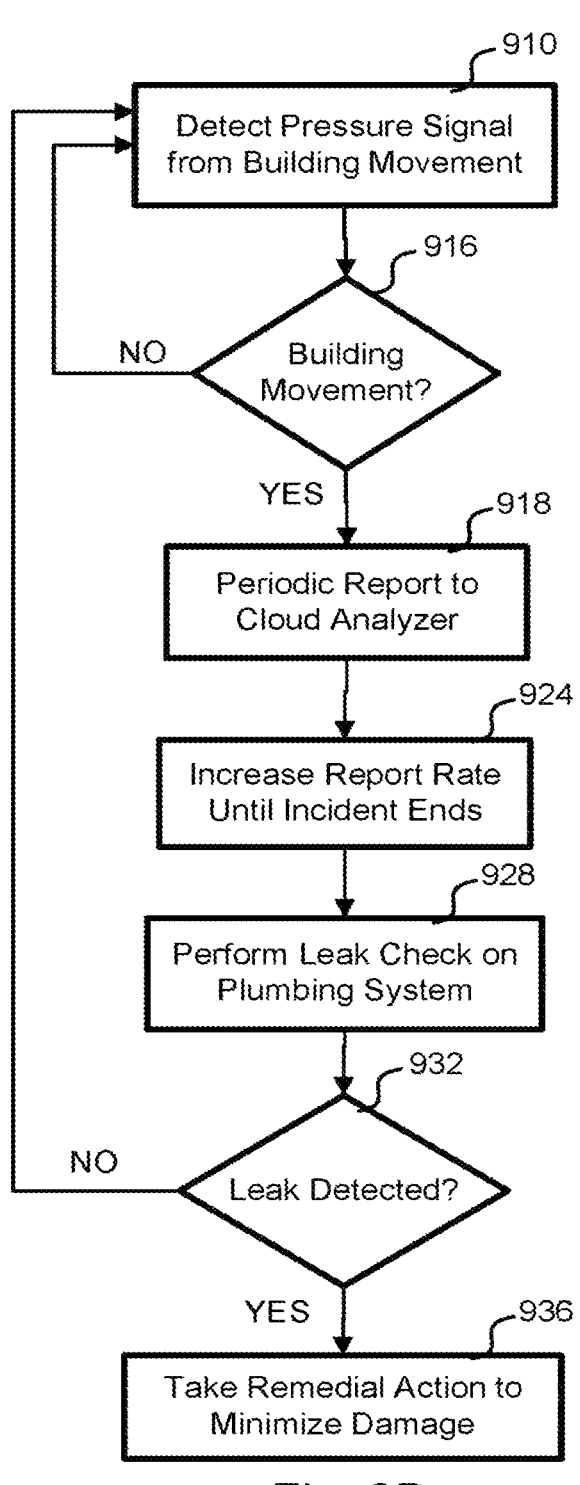
Figure 9C:
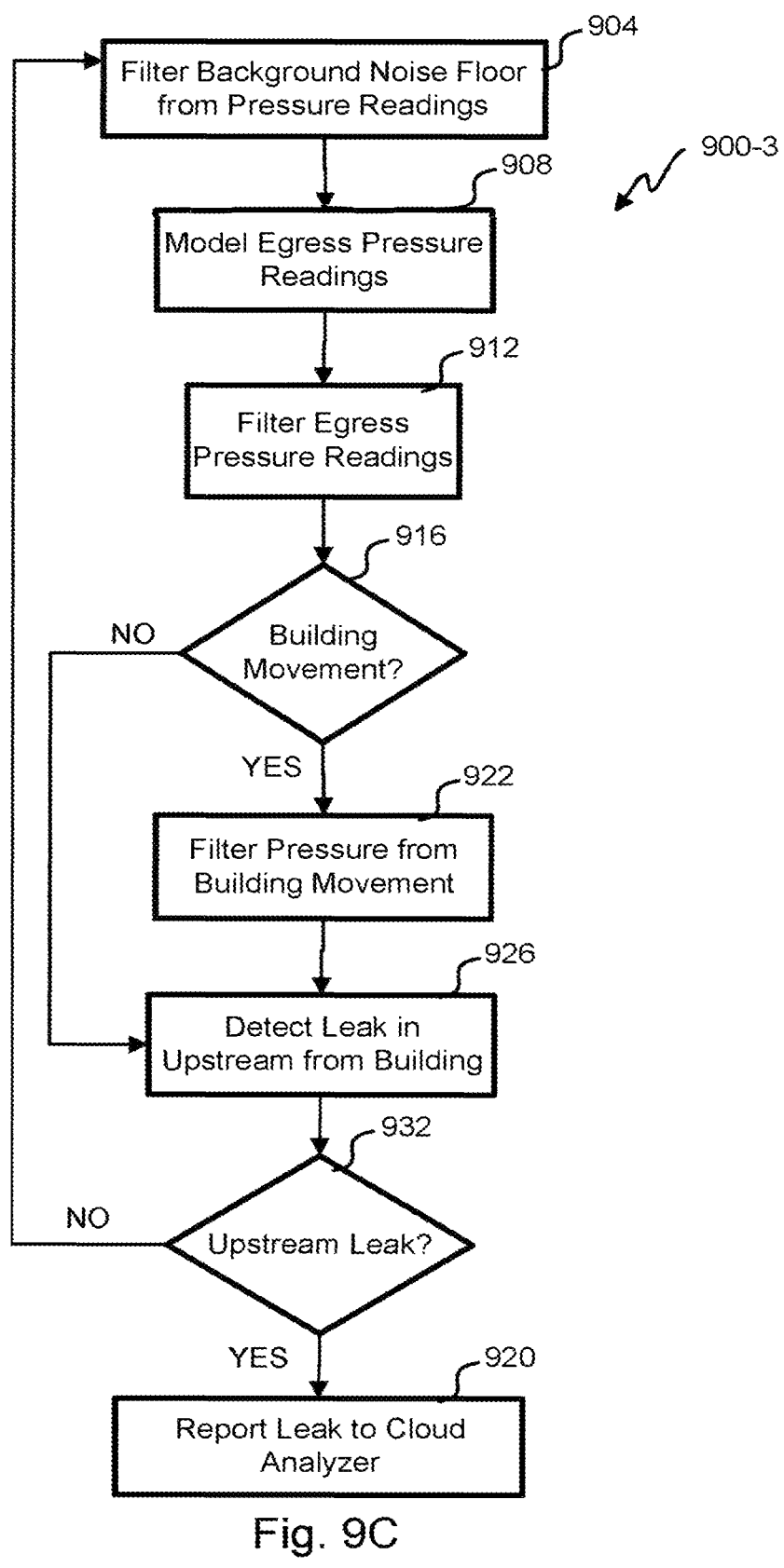

Referring next to FIGS. 9A-9C, flow charts of embodiments of methods 900 for detecting building movement are shown. The depicted portion of FIG. 9A begins in block 904, where background noise is filtered from the sensor signal(s) to determine building movement and possibly take remedial action. Sensor(s) and accelerometer(s) in the water device 120 are analyzed to identify the background noise. The background noise can be from outside the building 112, sound or vibration coupling to the plumbing system 116, and normal building movement induced by wind, water hammer effects, and pumps, for example. The pumps could be for a well water or cistern system or from the municipal water system infrastructure outside the building, for example, a pumping station. Egress from the plumbing system 116 is modeled to recognize different water usage. The sensor signal from normal egress is filtered in block 912. Remaining signal, can be from abnormal building movement detected in block 916. Where no movement is detected, processing returns to block 904 to repeat the processing of sensor readings over time.

If building movement is detected from flow sensor readings in the plumbing system 116, the movement is reported to the cloud analyzer 108 in block 920. The cloud analyzer 108 in this embodiment increases is polling or report rate for the water device 120 in block 924. Some embodiments detect likely building movement locally with the water device 120 and increase the reporting rate for a period of time. The cloud analyzer 108 determines where the earthquake is located as more water devices 120 and the increased reporting rate can be localized to the likely area affected by the earth movement in block 924. For the water devices 120 geographically located within an area likely affected by the earthquake, a leak check can be performed by the water device 120 under the possible instruction from the cloud analyzer 108 in block 928.

Where is leak is detected in block 932, remedial action can be taken to minimize damage in block 936. Remediation may include informing occupants of the building, app users, plumbers, police, etc. Some embodiments automatically shut off the water passing through the water device 120 or another electronic shutoff. Should no leak be detected, processing loops from block 932 to block 904 where the process 900-1 repeats.

Referring next to FIG. 9B, background noise is filtered from the sensor signal(s) to determine building movement and possibly take remedial action in the depicted process 900-2. This embodiment does not filter background noise or normal egress using algorithms to detect building movement from the pressure sensor(s) in block 910. Building movement has distinctive characteristics as the water accelerates and slows in the plumbing system 116. In this embodiment, the water device 120 reports at a normal interval such as a 5 second interval to report the detected building movement in block 918. Reporting rate increases, leak checks and other remedial action are taken as in the embodiment of FIG. 9A.

With reference to FIG. 9C, background noise is filtered from the sensor signal(s) to determine building movement, detect upstream leaks and possibly take remedial action in the depicted process 900-3. After performing blocks 904, 908, and 912 as before, building movement is detected in block 916. Where building movement is detected, the pressure signal is filtered away in block 922 before detecting leaks upstream from the building 112 or unit in block 926. When there is no building movement detected in block 916, block 922 is skipped to go directly to block 926. Once any building movement pressure signal is removed, leaks outside of the building or unit are detected in block 926. If no upstream leak is detected in block 932, processing loops back to block 904. Alternatively, where an upstream leak is detected, it is reported with the sensor readings over time to the cloud analyzer 108 in block 920.

Figure 10A:
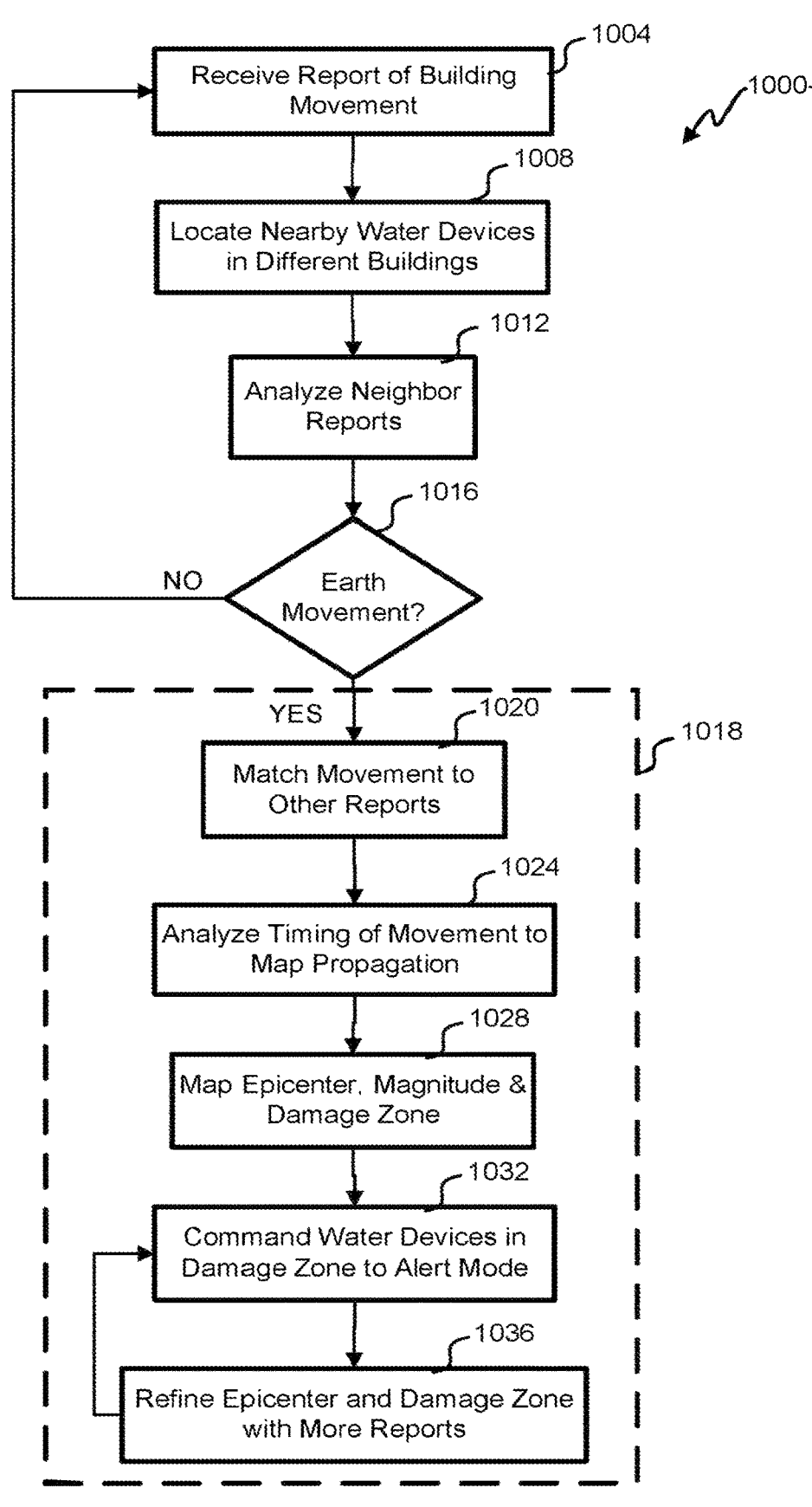
FIGS. 10A and 10B illustrate a flow chart of embodiments of a method for analyzing pressure signals in the municipal water system.

With reference to FIG. 10A, a flow chart of an embodiment of a method for analyzing earth movement 1000-1 with multiple geographically diverse water devices 120 is shown. The depicted portion of the process begins in block 1004 where the cloud analyzer 108 receives a report of building movement detected by a water device 120. Proximate water devices are located from different buildings in block 1008. The neighbor reports are analyzed in block 1012. By looking at nearby, but different building's water devices, the noise associated with natural building movement can be filtered out. Additionally, different plumbing systems 116 react in different ways so that close neighbor water devices 120 can be used to average out the movement readings. Where the reaction of a sensor in the water device 120 is characterized in time in relation to three dimensions of earth movement with different acceleration and travel distance, a model of how the sensors in the water device 120 is determined. There are constant small tremors and movement in buildings and where that is determined to be earth movement, a model of the changes in sensor readings with respect with different types of movement is developed.

Where no earth movement is detected in block 1016, processing loops back to block 1004 to wait for another report of building movement. Should earth movement be detected in block 1016 that is not due to normal building movement, the earth movement is matched to other reports of movement in block 1020. The relative timing of the movement reaching a water device is used by the cloud analyzer 108 in block 1024 to map the propagation of the earthquake along the earth's surface. In block 1028, the epicenter and magnitude are determined so that the plumbing systems likely to be affected is determined as a possible damage zone. The water devices 120 in the damage zone are put into an alert mode where leak detection becomes more frequent and suspicious, frequency of reports to the cloud analyzer is increased, and/or leak testing is performed. With additional data from the water devices and leaks in the damage zone, the epicenter, magnitude, acceleration, etc. can be refined to loop back to block 1032 for a more refined list of affected plumbing systems.

Figure 10B:
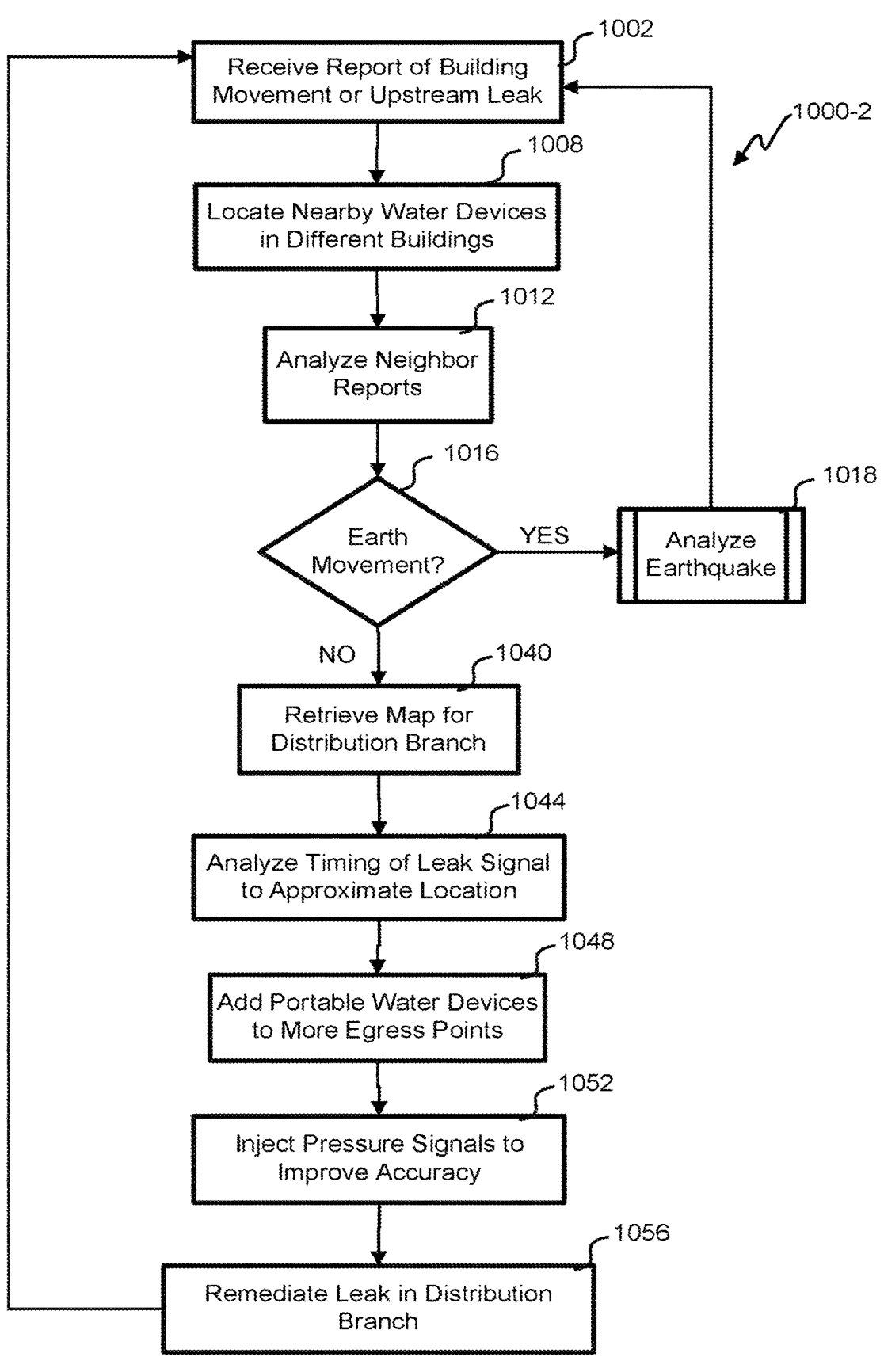

With reference to FIG. 10B, a flow chart of another embodiment of a method for analyzing pressure signals 1000-2 in the municipal water system 128 is shown. This embodiment can detect upstream leaks as well as detect earthquakes. The depicted part of the process begins in block 1002 where a water device 120 reports pressure signal from outside the building 112 that might be an earthquake or a leak. Nearby water devices 120 are located that are on the same distribution branch 154 in block 1008. Nearby water devices 102 may previously have been grouped together. Property address mapping can be fused with water distribution maps 336 to determine where the water mains 150 for the various buildings tap into the distribution branch 154. Water devices 120 in the nearby grouping are queried for pressure readings over time. Time stamps for pressure data allow synchronization along with the cloud analyzer 108 determining the time shift between different water devices 120 associated with the different propagation distance between the leak 710 and each water device. Drift can be compensated for over time by the cloud analyzer 108 to allow more accurately determining distance to the leak 710. Additionally, the attenuation by the PRV 408 between the plumbing system 116 in the building 112 and the water main 150 can be determined by the cloud analyzer 108 over time by comparing signals with neighbors. Amplitude of the pressure signal after attenuation correction can be used in some embodiments to aid in finding the location of the leak 710.

Where earth movement 1016 is determined to be the cause, processing continues to block 1018 for further analysis as was done for the embodiment of FIG. 10B. Where the upstream signal is not from earth movement and instead a leak 710, processing continues to block 1040 where the distribution map 336 is retrieved for the distribution branch 154. After compensating for drift, the timing of the leak signal received by multiple water devices 120 is analyzed in block 1044. For greater accuracy, portable water devices can be added close to the suspected leak 710 to provide more data in block 1048. The portable water devices can have geolocation trilateration to report a very accurate location in some embodiments. Additionally, transducers can be added to any point where the pipe is exposed upstream of the PRVs 408 to inject signal to improve leak 710 location accuracy in block 1052. Once there is confidence in the location of the leak, it can be fixed in block 1056.

Figure 11:
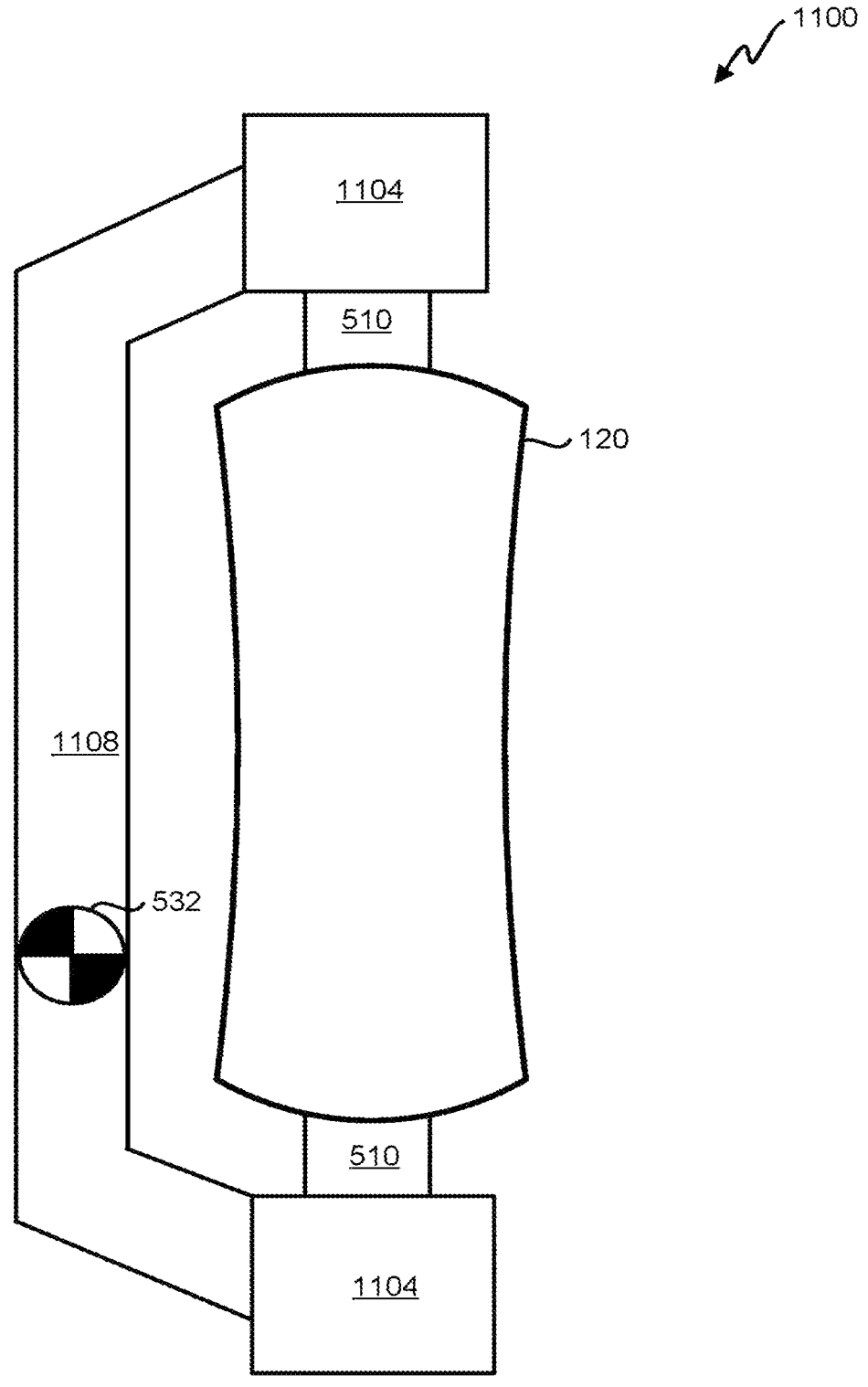
FIG. 11 illustrates an embodiment of a universal kit including a water device adapted to a source pipe.

Referring next to FIG. 11, an embodiment of universal kit 1100 that includes a water device 120 is shown mounted to a larger diameter source pipe 1104. The water device 120 has a pipe 510 of a first diameter (the "parasite path"), but the source pipe 1104 has a larger diameter. Different buildings have different diameter source pipes 1104 and use of water devices with a single diameter pipe 510 reduces the customizations for the possible source pipes 1104 (for example, diameters of 1.25, 1.5, 2, 2.5, or 3 inches). The water flow from the source pipe 1104 is divided between the pipe 510 parasite path and a bypass pipe 1108. The bypass pipe 1108 is sized such that the cross section areas of both the pipe 510 and the bypass pipe 1108 is approximately equal or slightly larger than the cross section area of the source pipe 1104.

Flow measured in the pipe 510 in the parasite path is a function of flow through the source pipe 1104. Different flow rates, plumbing configurations, pipe orientations with respect to gravity, etc. affect the function between the source pipe flow and the flow measured for the pipe 510. After characterization of the egress to particular fixtures, machine learning is used to estimate flow measurements and how they correspond to the actual flow in the source pipe 1104. This embodiment has a shutoff valve 532 in the bypass pipe 1108. Egress can be accurately calibrated when the shutoff valve is closed. The fingerprint in the pressure signal for each egress point does not change appreciably with the shutoff valve 532 open or closed. When the shutoff valve 532 is open, the flow can be more accurately estimated knowing what flowed when the shutoff valve 532 was closed. Other embodiments can include a flow sensor in the bypass pipe 1108 to determine the flow in the source pipe 1104 after determining the flow in both the pipe 510 and the bypass pipe 1108. Although this embodiment has one bypass pipe 1108, other embodiments could have multiple bypass pipes to accommodate larger source pipes. Some embodiments could use a flow diverter to modify the amount of flow that is diverted through the bypass path 1108.

A number of variations and modifications of the disclosed embodiments can also be used. For example, the plumbing analyzer can be used to monitor any liquid distributed in pipes. This could include industrial plants, sprinkler systems, gas distribution systems, refineries, hydrocarbon production equipment, municipal water distribution, etc. The plumbing system is a closed system with pressurized liquid (e.g., a gas) that is released in a selective and controlled manner using valves.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of 20% or ±10%, ±5%, or ±0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of 20% or ±10%, ±5%, or ±0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

We claim:

1. A water analysis system for detecting seismic events through geographically dispersed water devices, the water analysis system comprising:
a cloud analyzer configured to:
receive sensor data from sensors of a plurality of water devices located in one or more buildings of the water analysis system;

receive seismic measurements associated with a plurality of locations from third-party sources using a plurality of data bases that are accessible over the internet, wherein the seismic measurements greater than a threshold value trigger the cloud analyzer to process the sensor data from the plurality of water devices to detect movement of water in respective plumbing systems of the one or more buildings, and a water device detects movement of water in a pipe of a plumbing system;
use movement models for plumbing systems of the one or more buildings of the water analysis system to transform the sensor data into building movement, wherein the movement models include a three-dimensional function that translates the building movement and acceleration to readings for the water device coupled to the plumbing system;
determine earthquake movement of the plumbing system based on the readings from the water in a pipe proximate to the sensors of the plurality of water devices;
in response to determining the earthquake movement, activating a high sensitivity mode for the plurality of water devices; and
transmit a control signal to shut off the plumbing system via a valve actuator, and
a water device configured to:
receive the control signal; and
shut off the plumbing system using the valve actuator.

2. The water analysis system for detecting seismic events through geographically dispersed water devices, as recited in claim 1, wherein the cloud analyzer and/or the water device automatically turns off the water when the earthquake exceeds a predetermined threshold.

3. The water analysis system for detecting seismic events through geographically dispersed water devices, as recited in claim 1, wherein the cloud analyzer is hosted by a cloud provider or within an enterprise.

4. The water analysis system for detecting seismic events through geographically dispersed water devices, as recited in claim 1, further comprising filtering noise over time when earth movements and/or leaks are processed with the sensor data.

5. The water analysis system for detecting seismic events through geographically dispersed water devices, as recited in claim 1, wherein detection of earth movement by the cloud analyzer or reports of the seismic measurements are send as notifications to user devices.

6. The water analysis system for detecting seismic events through geographically dispersed water devices, as recited in claim 1, wherein learning algorithms use leakage of water after the earthquake to determine a remedial action.

7. The water analysis system for detecting seismic events through geographically dispersed water devices, as recited in claim 1, wherein temperature, pressure and flow sensors are used to determine the sensor data.

8. A method for detecting seismic events through geographically diverse water devices, the method comprising:
receiving by a cloud analyzer, sensor data from sensors of a plurality of water devices located in one or more buildings of a water analysis system;
receiving by the cloud analyzer, seismic measurements associated with a plurality of locations from third-party sources using a plurality of data bases that are accessible over the internet, wherein the seismic measurements greater than a threshold value trigger the cloud analyzer to process the sensor data from the plurality of water devices to detect movement of water in respective plumbing systems of the one or more buildings, and a water device detects movement of water in a pipe of a plumbing system;

using by the cloud analyzer, movement models for plumbing systems of the one or more buildings of the water analysis system to transform the sensor data into building movement, wherein the movement models include a three-dimensional function that translates the building movement and acceleration to readings for the water device coupled to the plumbing system;

determining by the cloud analyzer, earthquake movement of the plumbing system based on the readings from the water in a pipe proximate to the sensors of the plurality of water devices;

transmit a control command indicative of the earthquake movement to a water device; and shutting off the plumbing system using a valve actuator controlled by the water device.

9. The method for detecting seismic events through geographically diverse water devices, as recited in claim 8, wherein the cloud analyzer and/or the water device automatically turns off the water when the earthquake exceeds a predetermined threshold.

10. The method for detecting seismic events through geographically diverse water devices, as recited in claim 8, wherein the cloud analyzer is hosted by a cloud provider or within an enterprise.

11. The method for detecting seismic events through geographically diverse water devices, as recited in claim 8, further comprising filtering noise over time when earth movements and/or leaks are processed with the sensor data.

12. The method for detecting seismic events through geographically diverse water devices, as recited in claim 8, wherein detection of earth movement by the cloud analyzer or reports of the seismic measurements are sent as notifications to user devices.

13. The method for detecting seismic events through geographically diverse water devices, as recited in claim 8, wherein learning algorithms use leakage of water after the earthquake to determine a remedial action.

14. The method for detecting seismic events through geographically diverse water devices, as recited in claim 8, wherein temperature, pressure and flow sensors are used to determine the sensor data.

15. A cloud analyzer for detecting seismic events through geographically diverse water devices, the cloud analyzer comprising:

one or more processors; and one or more memories with code for:

receiving sensor data from sensors of a plurality of water devices located in one or more buildings of a water analysis system;

receiving seismic measurements associated with a plurality of locations from third-party sources using a plurality of data bases that are accessible over the internet, wherein the seismic measurements greater than a threshold value triggers the cloud analyzer to process the sensor data from the plurality of water devices to detect movement of water in respective plumbing systems of the one or more buildings, and a water device detects movement of water in a pipe of a plumbing system;

using movement models for plumbing systems of the one or more buildings of the water analysis system to transform the sensor data into building movement, wherein the movement models include a three-dimensional function that translates the building movement and acceleration to readings for the water device coupled to the plumbing system;

determining earthquake movement of the plumbing system based on the readings from the water in a pipe proximate to the sensors of the plurality of water devices;

transmit a control command indicative of the earthquake movement to a water device; and shutting off the plumbing system using a valve actuator controlled by the water device.

16. The cloud analyzer for detecting seismic events through geographically diverse water devices, as recited in claim 15, wherein the cloud analyzer and/or the water device automatically turns off the water when the earthquake exceeds a predetermined threshold.

17. The cloud analyzer for detecting seismic events through geographically diverse water devices, as recited in claim 15, wherein the cloud analyzer is hosted by a cloud provider or within an enterprise.

18. The cloud analyzer for detecting seismic events through geographically diverse water devices, as recited in claim 15, further comprising filtering noise over time when earth movements and/or leaks are processed with the sensor data.

19. The cloud analyzer for detecting seismic events through geographically diverse water devices, as recited in claim 15, wherein detection of earth movement by the cloud analyzer or reports of the seismic measurements are send as notifications to user devices.

20. The cloud analyzer for detecting seismic events through geographically diverse water devices, as recited in claim 15, wherein temperature, pressure and flow sensors are used to determine sensor data.

\* \* \* \* \*